(12) United States Patent
Iwami et al.

(10) Patent No.: US 6,950,914 B2
(45) Date of Patent: Sep. 27, 2005

(54) STORAGE SYSTEM

(75) Inventors: Naoko Iwami, Sagamihara (JP); Yasutomo Yamamoto, Sagamihara (JP); Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 10/712,031

(22) Filed: Nov. 14, 2003

(65) Prior Publication Data

US 2005/0033804 A1 Feb. 10, 2005

(30) Foreign Application Priority Data

Aug. 6, 2003 (JP) .................................... 2003-206168

(51) Int. Cl.⁷ .......................... G06F 12/00; G06F 13/12
(52) U.S. Cl. .................... 711/154; 709/214; 710/33; 710/74
(58) Field of Search ........................ 707/1; 709/213, 709/214, 216; 710/33, 36, 37, 74; 711/100, 154

(56) References Cited

U.S. PATENT DOCUMENTS

| 6,125,428 A  * | 9/2000 | Miyazaki et al. ............ 711/112 |
| 6,256,740 B1 | 7/2001 | Muller et al. ................ 713/201 |
| 6,606,690 B2 * | 8/2003 | Padovano .................... 711/148 |
| 6,850,955 B2 * | 2/2005 | Sonoda et al. .............. 707/200 |
| 2002/0065916 A1 | 5/2002 | Ooe et al. .................... 709/225 |
| 2002/0083111 A1 * | 6/2002 | Row et al. ...................... 709/1 |
| 2003/0023784 A1 | 1/2003 | Matsunami et al. .......... 710/36 |
| 2003/0028731 A1 | 2/2003 | Spiers et al. ................ 711/147 |
| 2003/0105767 A1 | 6/2003 | Sonoda et al. .............. 707/100 |
| 2003/0225735 A1 | 12/2003 | Weber .......................... 707/1 |

FOREIGN PATENT DOCUMENTS

WO 02/069166 9/2002

* cited by examiner

Primary Examiner—Gary Portka
(74) Attorney, Agent, or Firm—Mattingly, Stanger, Malur & Brundidge, P.C.

(57) ABSTRACT

The relation between a NAS server and a port set with a network address given to the NAS server is uniquely decided at 1:1 so that the processing performance of a TCP/IP processor or the NAS server creates a bottleneck to lower the response.

A host computer separates: an I/F portion, to which an address which sends a command is given; a NAS server portion; a cache control portion which processes a device; and an I/F portion which accesses an external storage, and accesses them through an internal network 170 so that the corresponding relation between the I/F and the NAS server and the corresponding relation between the address given to the I/F and the NAS server can be arbitrarily reconfigured according to the processing load or the like.

22 Claims, 19 Drawing Sheets

LOWER LOGICAL DEVICE MANAGEMENT INFORMATION 201

PHYSICAL DEVICE MANAGEMENT INFORMATION 202

STORAGE SYSTEM

BACKGROUND OF THE INVENTION

The present invention relates to a storage system for storing data to be used by a computer in a computer system and, more particularly, to a storage system to be file-accessed through a network.

In recent years, the quantity of data to be handled in the computer increases so drastically that the capacity of the storage system for storing the data grows accordingly more and more. As a method for realizing the large-sized storage of a large scale but a lower cost, there is a storage system, which has a cluster configuration, an disclosed in U.S. Pat. No. 6,256,740.

The storage system of the cluster configuration is configured to have a plurality of storages (hereinafter referred to as "storage nodes") of a relatively small configuration are coupled to each other through switches or the like. In this configuration, the cluster configuration storage system can be configured by coupling a plurality of storage nodes according to the storage capacity needed, so that storage systems having various capacities from small to large ones can be scalably realized.

As one kind of the storage system, on the other hand, there is a Network Attached Storage (hereinafter referred to as "NAS"). This is a storage system capable of accepting a file access through the network, and in fact, it is configured by a computer (hereinafter referred to as "NAS server") for providing the file system and a storage such as a disk device. Here, the "file" indicates a cluster of the data to be recognized by the user in the file system or the like.

The NAS is a storage system, which is usable because the user can use the file access directly. However, a protocol (e.g., the NFS) for accessing the NAS is premised by the use of the TCP/IP (Transmission Control Protocol/Internet Protocol). As the frequency of the access to the NAS rises, therefore, the processing load on the TCP/IP in the NAS raises a problem. As a technique for solving this problem, there is disclosed in PCT International Laid-open No. 02/069166 a technique, in which the processing of the TCP/IP is separated from the NAS server into a single hardware (hereinafter referred to as "TCP/IP processor") and in which the TCP/IP processor and the NAS server are accessed through a switch. In PCT International Laid-Open No. 02/069166, the command issued by the computer is processed up to the TCP/IP layer by the TCP/IP processor and is then processed by the NAS server. In case the NAS server accesses the storage, there is used the storage which is connected to the SAN through Fiber Channel Switching Module.

SUMMARY OF THE INVENTION

In the technique disclosed in PCT International Laid-Open No. 02/069166, the relation between the NAS server to be accessed and the port of the TCP/TM processor set with the network address given to the NAS server is uniquely decided at 1:1. When the frequency of accessing the NAS server rises or when the quantity of data to be transferred increases, therefore, the processing performance of the TCP/IP processor or the NAS server creates a bottleneck to lower the response. In use the TCP/IP processor or the NAS server fails, moreover, it is impossible to continue the use of the NAS having failed.

Moreover, the aforementioned problems cannot be solved merely by introducing the NAS simply into the cluster configuration storage system of U.S. Pat. No. 6,256,740.

One embodiment of the present invention is a storage system having the following configuration. The storage system comprises: an interface unit (hereinafter referred to as "I/F processor") which processes the communication protocol of a frame (containing a command, data and so on, and may be a packet or the like) to be transferred between the storage system and a computer; a first controller (hereinafter referred to as "NAN unit") which processes the file operation (to write, read, create and delete the data in a file); a second controller (hereinafter referred to as "cache adapter") which controls a storage; and an internal network for accessing the individual portions mutually. In this configuration, the I/F processor having the received the frame transmitted by the computer transmits the received frame on the basis of its contents to the NAS processor, and transmits the frame to the cache adaptor. At this time, the I/F processor uses the information on the corresponding relation between the address assigned to the I/F processor and the NAS unit.

In another embodiment, moreover, the configuration may be modified such that the aforementioned storage system has a second I/F processor connected to another storage system. In this case, moreover, the cache adapter may be omitted from the aforementioned configuration. In this case, the frame is transferred to another storage system through the first I/F processor and the second I/F processor.

In accordance with the status, on the other hand, the NAS unit having accepted the frame takes access to another storage system for a predetermined operation through the cache adapter or the second I/F processor, and then transmits a response to the frame, to the I/F processor. At this time, the NAS unit uses the information on the corresponding relation between the file and the cache adapter or another storage system stored with the file.

Here, it is possible to conceive another embodiment, which is configured to include plurality of I/F processors and a plurality of NAS units so that either the processing load may be distributed or the processing may be inherited when a failure occurs, by suitably setting the corresponding relation between the I/F processor and the NAS unit.

In another embodiment, the configuration may be modified such that the cache adapter has neither the cache memory nor the disk device.

In a configuration of another embodiment, moreover, the management computer (hereinafter referred to as "management server") which manages the various kinds of information such as the corresponding relation between the address assigned to the I/F processor and the NAS unit or the corresponding relation between the file to be processed by the NAS unit and either the cache adapter stored with the file or another storage system, or a similar manager is provided in the storage system (or connected to the storage system). The management server issues a reconfiguration instruction of the corresponding relation between the address assigned to the I/F processor and the NAS unit, to the storage system so that the reconfiguration can be made to distribute the processing load and to inherit the processing when a failure occurs.

DESCRIPTION OF THE PREFERRED EMBODIMENTS

Figure 1:
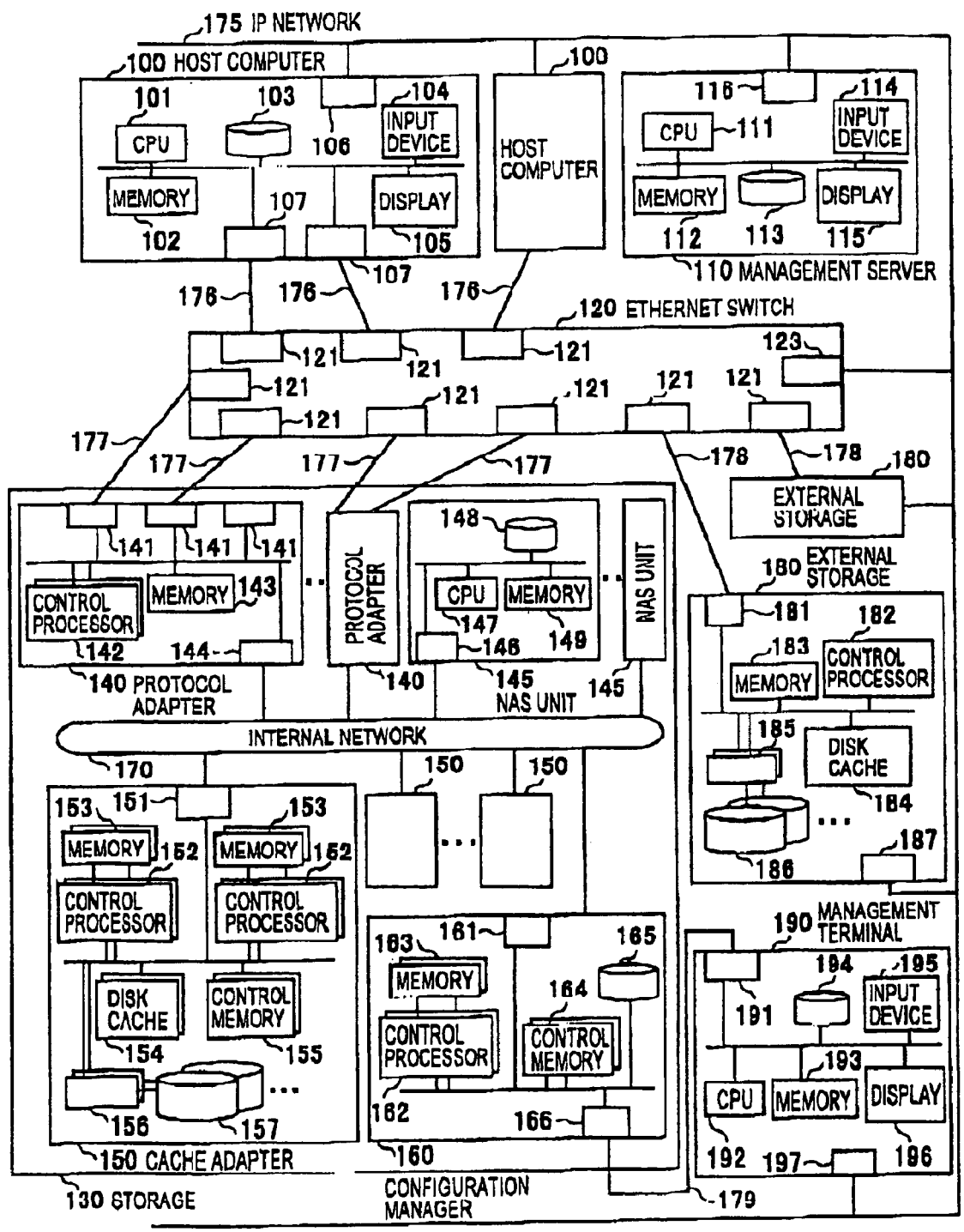
FIG. 1 shows one example of the hardware configuration of a system.

FIG. 1 is a diagram showing a configuration of one embodiment of the system, to which the present invention is applied. This system includes: at least one computer (hereinafter referred to as "host computer") 100; at least one switch 120; a storage system (hereinafter referred to as "storage") 130; at least one storage (hereinafter referred to as "external storage") 180 connected to the storage 130 through the switch 120; a management server 110; and a management terminal 190.

The host computer 100, the switch 120, the storage 130 and the external storage 180 are connected to the management server 110 through an IP network 175 and is integrally managed by the not-shown management software operated by the management server 110. Here in this embodiment, the storage 130 takes a mode, in which it is connected to the management server 110 through the management terminal 190, but may be so configured that the storage 130 is directly connected to the IP network 175.

The host computer 100 is a computer including a CPU 101 and a memory 102, and performs predetermined programs by causing the memory 102 to read the softwares such as the operating system and the application programs, which are stored in a storage 103 such as a disk device or an optical magnetic disk device, so that the CPU 101 reads from the memory 102 and executes the softwares. Moreover, the host computer 100 is provided with an input device 104 such as a keyboard or a mouse and an output device 105 such as a display. An input from the host management unit or the like is accepted by the input device 104 and the information instructed by the CPU 101 is outputted to the output device 105.

Moreover, the host computer 100 is provided with at least one port 107 which transmits and receives the data to and from the external device such as the storage 130 through a network 176, and at least one interface controller 106 which transmits and receives the data to and from the management server 110 through the IP network 175.

The management server 110 is a computer like the host computer 100 and performs predetermined programs such as the operation/maintenance managements of the entire system by causing the memory 112 to read the management software and so on, which are stored in a storage 113 such as a disk device or an optical magnetic disc device, so that CPU 111 reads from the memory 112 and executes the software. When the management software is run by a CPU 111, the management server 110 collects the configuration information, the resource using rate and the performance monitoring information of the individual devices in the system, from an interface controller 116 through the IP network 175. The management server 110 outputs those collected information to an output device 115 and presents them to the manager or the like of the storage. The management server 110 receives an instruction from the storage manager through an input device 114 and transmits the received operation/maintenance instructions to the individual devices through the interface controller 116.

The switch 120 has a plurality of ports 121 and an interface controller 123. The ports 121 are connected to the ports 107 of the host computer 100 through the IP network 176 or with ports 141 of the storage 130 through an IP network 177. Moreover, the interface controller 123 is connected to the management server 110 through the IP network 175. The switch 120 performs the general programs such as the path controls belonging to the switches in the IP network 175.

The storage 130 has a cluster configuration. Specifically, the storage 130 includes a plurality of protocol adapters 140, a plurality of cache adapters 150, at least one a NAS unit 145, and a configuration manager 160, which are connected to each other by an internal network 170.

The protocol adapter 140 includes a plurality of ports 141, at least one control processors 142, a memory 143, and a network controller 144 connected to the internal network 170. The protocol adapter 140 analyzes the command received from the port 141 to decide the device or the NAS unit 145 to be accessed, and transfers a command or data from the network controller 144 to the suitable cache adapter 150 or NAS unit 145 through the internal network 170. Here, th "device" will be termed as the physical or logical storage area provided by the storage.

On the other hand, the protocol adapter 140 can be connected to another storage such as the external storage 180 through the port 141. In this case, the protocol adapter 140 connected to the external storage 180 transmits an input/output request received from another protocol adapter 140 or an input/output request received from the cache adapter 150, to the external storage 180. As a result, the host computer 100 or the NAS unit 145 can write the data in the external storage 180 (hereinafter referred to as "Write") or can read the data from the external storage 180 (hereinafter referred to as "Read").

Here in this embodiment, the ports 141 are assumed to correspond to both TCP/IP to be used mainly in the IP network and the Fiber Channel (hereinafter referred to as "FC") using the SCSI as the upper protocol. The communication protocol such as the NFS to be used for an access to the NAS is located as the upper protocol of the TCP/IP protocol. In this embodiment, for simplicity or description, the file access protocol to be used for an access to the NAS is the NFS, but may be another protocol such as the CIFS or may support a plurality of file access protocols. Moreover, the iSCSI (Internet SCSI) or the like to be used in the case of a storage access (of the device) through the IP network is also located as the upper protocol of the TCP/IP protocol. The protocol adapter 140 corresponds to not only the protocol to be used for an access to the NAS such as the NFS but also the protocol for an access to the device belonging to the storage such as the iSCSI.

In case the device of the storage 130 or the external storage 180 is to be utilized as the block device, the host computer 100 communicates with the storage 130 by using the protocol such as the FC or the iSCSI through the FC or IP network.

Here, the ports 141 may have a configuration not corresponding to the protocol of the FC. Moreover, the configuration may also correspond only to the protocol to be used for an access to the NAS such as the NFS.

The cache adapter 150 includes: at least one port 156; at least one disk device 157 connected to each port 156; at least one control processor 152; a memory 153 corresponding to each control processor 152, at least one disk cache 154; at least one control memory 155; and a network controller 151 connected to the internal network 170.

The control processor 152 processes such an input/output request for the disk device 157 existing in the common cache adapter 150 as is received through the internal network 170 by the network controller 151. In case the cache adapter 150 provides the host computer 100 or the NAS unit 145 with the disk devices 157 as one or more lower logical devices like the disk array, the control processor 152 performs the management of the corresponding relation between the lower logical device and the disk device 157 and the program to convert the access request for the lower logical device into the access request for the disk device 157. Further, the control processor 152 runs the various programs such as the data copy or the data reconfiguration.

In order to accelerate the processing speed for th access request from the host computer 100 or the NAS unit 145, the disk cache 154 is stored in advance with the data frequently read from the disk device 157 and temporarily with the write data received from the host computer 100. Here, a response to a write request is returned to the host computer 100 or the NAS unit 145, after the asynchronous destaging operation using the disk cache 154, i.e., the writing data (hereinafter referred to as "write data") received from the host computer 100 or the NAS unit 145 was stored in the disk cache 154 and before the same is actually written in the disk device 157. In this case, in order to prevent the write data stored in the disk cache 154 from disappearing before written in the disk device 157, it is desired to improve the usability of the disk cache 154 either by making the disk cache 154 as a nonvolatile memory by a battery backup or by doubling the same for improvement a resistance to a medium failure.

The control memory 155 is stored with information necessary for the cache adapter 150 to manage; the disk device 157, the physical device configured in combination of the disk devices 157 or the device in the external storage 180 (hereinafter referred to as "external device"), as connected to the storage 130 through the protocol adapter 140; and the corresponding relationship between the external device or the physical device and the lower logical device. When the control information stored in the control memory 155 disappears, the host computer 100 or the NAS unit 145 becomes unable to access the data stored in the disk device 157 belonging to the cache adapter 150. It is, therefore, desired that the control memory 155 is configured for a higher usability by making it into the nonvolatile memory with the battery backup or by doubling it for improving the resistance to the medium failure.

In another configuration, moreover, the cache adapter 150 may control only the devices or the external storage 180 exclusively, without the port 156 and the disk 157.

The NAS unit 145 includes: one or more CPUs 147; one or more memories 149 corresponding to the individual control processors; and a network controller 146 connected to a storage 148 and the internal network 170. The control programs stored in the storage 148 are read to the memory 149 and are run by the CPU 147, so that the NAS unit 145 performs predetermined programs.

The CPU 147 processes the command, as received from the network controller 146 through the internal network 170, and transmits the response command to the protocol adapter 140 having transmitted the command. In case the device access is needed (for writing or reading the data in or from the file) at the command processing time, the CPU 147 transmits the input/output request through the network controller 146 to either the cache adapter 150 providing that device (namely, providing the device to be mounted in the file system being executed in the NAS unit) or the external storage 180, and receives the response through the internal network 170 from the network controller 146. Here in the case of accessing the device, the NAS unit 145 converts the received command of the file access into the access command to the block of the device, in which the data of that file are stored.

The configuration manager 160 includes: one or more control processors 162; one or more memories 163 corresponding to the individual control processors; one or more control memories 164; a storage 165; a network controller 161 connected to the internal network 170; and an interface controller 166. The control program stored in the storage 165 is read in the memory 163 and is run by the control processor 162, so that predetermined programs for the configuration management and the failure management of the storage 130 are run.

The control processor 162 transmits the configuration information to be presented to the storage manager, to the management terminal 190 accessed thereby through the interface controller 166, and receives the maintenance/operation instruction inputted from the manager to the management terminal 190, from the management terminal 190, so that it reconfigures the storage 130 in accordance with the instruction received. The configuration information of the storage 130 is stored in the control memory 164. The configuration information stored in the control memory 164 can be referred to or updated by the control processor 142 of the protocol adapter 140, the control processor 152 of the cache adapter 150, and the control processor 147 of the NAS unit 145. As a result, the configuration information can be shared between the protocol adapter 140 and the cache adapter 150 in the storage 130.

Here in case the configuration manager 160 is made inoperable by a failure, the storage 130 cannot be accessed in its entirety. It is, therefore, desired to double the individual configuration components in the configuration manager 160 or to mount the configuration manager 160 in plurality in the storage 130 thereby to double the configuration manager 160 itself. Moreover, an I/F from the management terminal 190 to each cache adapter 150 can be separately provided to share the control of the configuration manager 160 between each cache adapter 150 and the management terminal 190 thereby to configure the configuration manager 160 exclusively of the control memory 164. The configuration manager 160 can also be omitted by holding the information in the control memory 164, in the control memory 155 of each cache adaptor 150.

The internal network 170 connects the protocol adapter 140, the cache adapter 150 and the configuration manager 160 to each other, and executes the transmissions/receptions of the data, the control information and the configuration information between those individual devices. With this internal network 170, the configuration manager 160 is enabled to manage the configuration of the storage 130 by distributing the configuration information of the storage 130 to the protocol adapter 140, the cache adapter 150 and the NAS unit 145 and by acquiring the configuration information from the protocol adapter 140, the cache adapter 150 and the NAS unit 145.

The internal network 170 transfers the access request among the protocol adapter 140, the cache adapter 150 and the NAS unit 145 so that the host computer 100 can access an arbitrary upper logical device belonging to the NAS unit 145 or the cache adapter 150, from an arbitrary port 141 of the protocol adapter 140. Here, the internal network 170 is desirably multiplexed from the viewpoint of improving the usability.

The management terminal 190 is a computer including: a CPU 192; a memory 193; a storage 194; an interface controller 191 connected to the configuration manager 160; an interface controller 197 connected to the IP network 175; an input device 195 which accepts an input from the storage manager; and an output device 196 such as a display which outputs the configuration information or the management information of the storage 130 to the storage manager. The CPU 192 reads out the storage management program stored in the storage 194, to the memory 193, and runs the program thereby to refer to the configuration information, instruct the reconfiguration and instruct the operation of a specific function, so that it acts as an interface between the storage manager or the management server 110 and the storage 130 in connection with the maintenance/operation of the storage 130.

Here, the storage 130 may also be managed with a management software operating on the management server 110, by omitting the management terminal 190 to access the storage 130 directly with the management server 110.

The external storage 180 includes: one or more ports 181 connected to the port 141 of the protocol adapter 140 in the storage 130; a control processor 182; a memory 183; a disk cache 184; one or more disk devices 186; one or more ports 185 connected to the individual disk devices 186; and an interface controller 187 connected to the IP network 175. The external storage 180 is connected to the storage 130 through its own port 181 and switch 120. The external device or the logical storage area, which is configured of the disk device 186 belonging to the external storage 180, is provided as the upper logical device belonging to the storage 130, to the NAS unit 145 or the host computer 100 by the storage 130.

Here, the system may also be provided with an FC switch in addition to the switch 120 so that the external storage 180 may be connected to the storage 130 through the FC switch. The storage 130 and the external storage 180 may also be directly connected to each other not through the switch. Further, the system may also be configured without the external storage 180.

The control processor 182 runs the program stored in the memory 183, to process the input/output request received from the port 181 to the disk device 186. In this embodiment, the external storage 180 is made of a storage having not a cluster configuration but a smaller configuration than that of the storage 130, but may be a storage of a similar scale having the same configuration as that of the storage 130. Moreover, the external storage 180 maybe a single disk device group such as the JBOD (Just Bunch Of Disk) having neither the disk cache 184 nor the control processor 182.

Here will be briefly described the summary of the operations of the system of this embodiment.

The upper logical device, which is configured of the disk device 157 belonging to the storage 130 or the external device, is partially or wholly provided for the NAS unit 145 for the file access program.

The command (or the command of the file access), which is transmitted to the storage 130 so that the host computer 100 may use the file stored in the storage 130, arrives at the port 141, to which the file accessing (NFS) address is assigned, of the storage 130. The protocol adapter 140 having that port 141 analyzes that command, selects the NAS unit 145 to process the command, and transmits the command to the NAS unit 145 selected through the internal network 170.

The NAS unit 145 having received the command manages the file designated by the command. In case the access to the device (i.e., the file stored in that device) becomes necessary while the command is being processed, the NAS unit 145 transmits the access command to the cache adapter 150 to acquire the necessary data or to store the data in the cache adapter 150, if that device is the upper logical device provided by the cache adapter 150. Here in case the external device is contained in the upper logical device, the cache adapter 150 transmits the command through the protocol adapter 140 to the external storage 180. In case the NAS unit 145 utilized the device provided by the external storage 180 directly, the NAS unit 145 transmits the access command to the protocol adapter 140, by which that external storage 180 is accessed, to acquire the necessary data or to store the data in the device provided by the external storage 180.

The NAS unit 145 having ended the processing of the command generates a response command and transmits it to the protocol adapter 140 of the transmitter of the command which was received in advance through the internal network 170. The protocol adapter 140 having received the response command transmits the response command to the host computer 100.

Here, for simplicity of expressions, the protocol adapter 140, the cache adapter 150, the configuration manager 160, the management terminal 190 and the NAS unit 145 will be abbreviated into PA, CA, MA, ST and AA, respectively, in the following description.

In the embodiment of the present invention, the relations (Hereinafter referred to as "device layer") among the individual disk devices, physical devices, the lower or upper logical devices in the storage 130 are as follows.

At first, in the CA, a plurality of disk devices 157 configure the disk array, which is managed as the physical device by the CA. The external device provided by the external storage 180 connected to the PA is recognized by the PA and is then managed by the MA.

In the CA, moreover, the lower logical device is assigned to either the physical device existing in the CA or the external device to be connected through that CA. The lower logical device is managed in each CA, and its number is managed independently of each CA. The lower logical device is made to correspond to the upper logical device by the MA and is provided as the logical storage (or device) provided by the storage 130, for the host computer 100 or the AA.

Specifically, what is recognized by the host computer 100 or the AA is the upper logical device of the storage 130, and the host computer 100 accesses the data stored in the storage 130 or the external storage 180, by using the information for identifying the upper logical device. However, the AA can access the external device of the external storage 180 directly through the PA in accordance with the management information. In this case, the external device is not assigned to a specific CA.

Here, the individual disk devices 157 may be one physical device, one lower logical device and one upper logical device. A plurality of physical devices may correspond to one or more lower logical devices, and a plurality of lower logical devices may also correspond to one or more upper logical devices.

Before entering into the operations or this system, here will be described the pieces of information, which belong to the individual configuration elements of this system.

Figure 2:
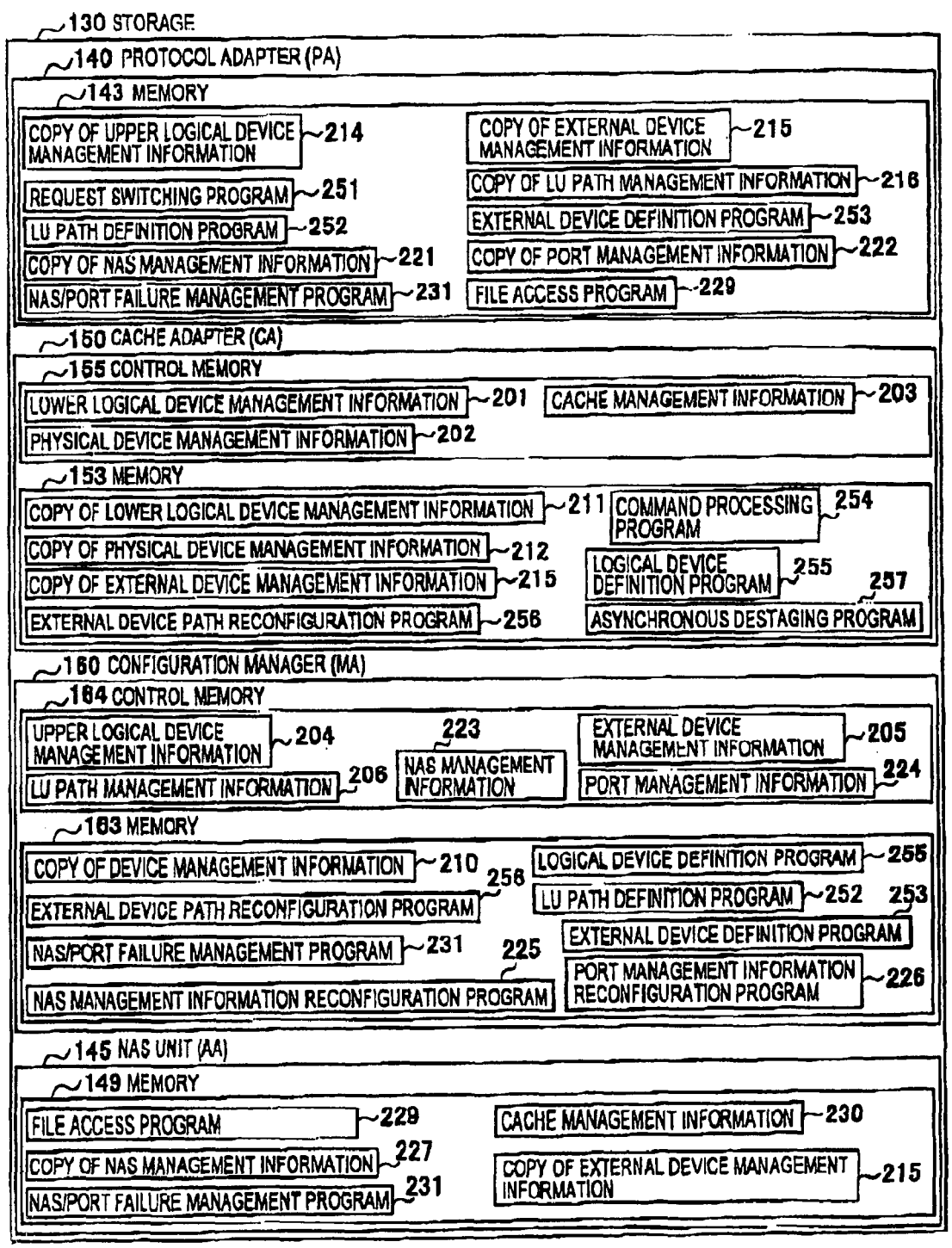
FIG. 2 is a diagram showing one example of the software configuration of a storage 130.

FIG. 2 is a software configuration diagram showing one example of the control memories of the individual configuration elements of the storage 130, the control information and the management information stored in the memories, and the programs for the storage control processing.

As the management information for managing the device layer of the storage 130, lower logical device management information 201, physical device management information 202 and cache management information 203 are stored in the control memory 155 of the CA, and upper logical device management information 204, external device management information 205 and LU path management information 206 are stored in the control memory 164 of the MA.

The individual pieces of control information stored in the control memory 155 of the CA and in the MA can be referred/updated from each CA, each PA, each AA and each control processor in the MA, but then an access is needed through the internal network 170 or the like. In order to improve the processing performance, therefore, a copy of the control information necessary for the program to be run in each control processor is held in the memory in each portion (i.e., CA, PA, AA and MA).

In case the control information managed by each portion is updated by a reconfiguration, this portion notifies another portion of it through the internal network 170 so that the latest information is fetched from the control memory of that portion by the memory of another portion. In another method for notifying another portion of the updating in case the control information is updated, for example, each portion is provided with a flag indicating the presence or absence of the updating on the control memory for each configuration information held in the control memory of itself, so that the control processor of each portion checks the updating with reference to that flag either at the time of starting its processing or at each time of referring to each configuration information.

Here, the memory of each portion is stored with the control program to operate on the control processor in each portion in addition to the copy of the aforementioned control information.

As the management information on the processing (e.g., the file access or a fail-over at a failure) of the NAS, NAS management information 223 and port management information 224 are stored in the control memory 164 of the MA.

The memory 143 of the PA is stored with: a copy 214 of either the entirety of the upper logical device management information 204 or the information on the operation of the PA; a copy 215 of either the entirety of the external device management information 205 or the information on the operation of the PA; a copy 216 of either the entirety of the LU path management information 206 or the information on the operation of the PA; a copy 222 of port management information of either the entirety of the port management information 224 or the information on the operation of the PA; a copy 221 of NAS management information of either the entirety of the NAS management information 223 or the information on the operation of the PA; a request switching program 251 for switching the data or commands received from the port 141 or the network controller 144; an LU path definition program 252; an external device definition program 253; a NAS/port failure management program 231; and a file access program 229.

The control memory 155 of the CA is stored with the lower logical device management information 201, the cache management information 203 and the physical device management information 202. The memory 153 is stored with: a copy 211 of the lower logical device management information 201; a copy 212 of the physical device management information 202; a copy 215 of either the entirety of the external device management information 205 or the information on the operation of the CA; a command processing program 254 for processing the input/output command received from the PA or the AA; a logical device definition program 255; an asynchronous destaging program 257; and an external device path reconfiguration program 256.

The control memory 164 of the MA is stored with the upper logical device management information 204, the external device management information 205, the LU path management information 206, the NAS management information 223 and the port management information 224. The memory 163 is stored with a copy 210 of the entire device management information (i.e., the upper logical device management information 204, the lower logical device management information 201, the physical device management information 202 and the external device management information 205), the logical device definition program 255, the external device path reconfiguration program 256, the LU path definition program 252, the NAS/port failure management program 231, the external device definition program 253, a NAS management information reconfiguration program 225 and a port management information reconfiguration program 226.

The memory 149 of the AA is stored with: a copy 227 of the entirety of the NAS management information 223 or the information on the processing of the AA; the copy 215 of the entirety of the external device management information 205 or the information on the processing of the AA; the cache management information 230 of the AA; the NAS/port failure management program 231; and the file access program 229.

Here in this embodiment, all the pieces of management information (i.e., the lower logical device management information 201, the physical device management information 202, the upper logical device management information 204, the external device management information 205, the LU path management information 206, the NAS management information 223, the port management information 224, and their individual copies) are assumed to have been set in advance at the initial values at the shipping time of the storage 130. After this, these values are properly set and changed for the operations by using the later-described method under the control of the storage manager or the management server.

Figure 15:
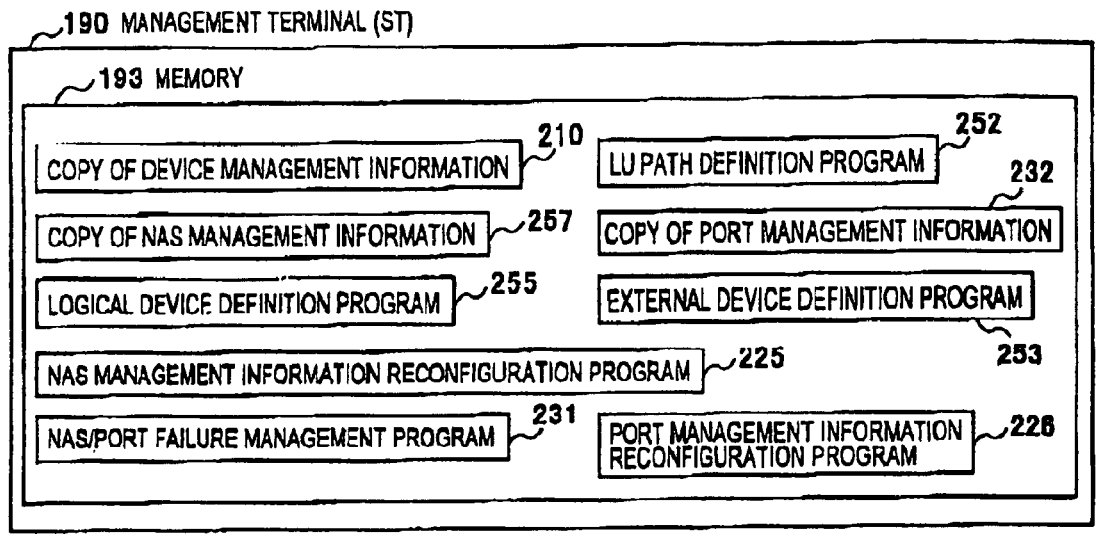
FIG. 15 is a diagram showing one example of the software configuration of a management terminal.

FIG. 15 is a software configuration diagram showing one example of a program for the control information and the storage control processing stored in the control memory of ST. The memory 193 is stored with: a copy 210 of the whole device management information (i.e., the upper logical device management information 204, the lower logical device management information 201, the physical device management information 202 and the external device management information 205); the copy 257 of the NAS management information 223; a copy 232 of the port management information 224; the logical device definition program 255; the LU path definition program 252; the external device definition program 253; the NAS management information reconfiguration program 225; the port management information reconfiguration program 226; and the NAS/port failure management program 231.

Figure 3:
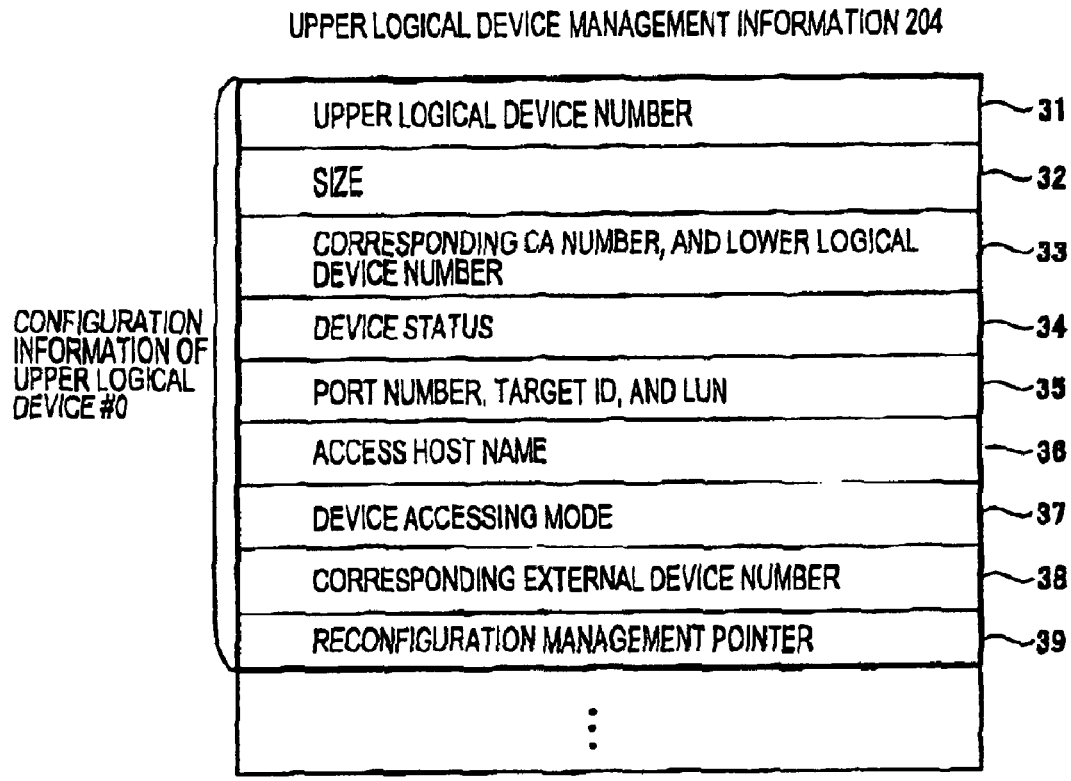
FIG. 3 is a diagram showing one example of upper logical device management information.

FIG. 3 is a diagram showing one configuration example of the upper logical device management information 204. The upper logical device management information is provided for every upper logical devices with entries 31 to 39 for holding the sets of information from the upper logical device number to the corresponding external device number. Here, the entry 39 may be omitted in case the reconfiguration management program is not used.

The entry 31 is stored with the number which is assigned by the MA to the upper logical device so as to identify the corresponding upper logical device. The entry 32 is stored with the storage capacity of the upper logical device which is decided with the upper logical device number. The entry 33 is stored with the number of the lower logical device corresponding to the upper logical device and the number of the CA, to which the lower logical device belongs. In case the upper logical device is not defined, the entry 33 is set with an invalid value. Here, this number of lower logical device is the entry number of the lower logical device management information 201 held by the CA managing the lower logical device.

The entry 34 is set with the information indicating the status of the corresponding upper logical device. As this status, there are "On Line", "Off Line", "Not Mounted" and "Failure Off Line". The "On Line" indicates the status, in which the upper logical device runs normally so that it can be accessed from the host computer 100 or the AA. The "Off Line" indicates the status, in which the upper logical device is defined and running normally but cannot be accessed from the host computer 100 or the AA because the LU path is undefined or for other reason. The "Not Mounted" indicates the status, in which the upper logical device is not defined so that it cannot be accessed from the host computer 100 or the AA. The "Failure Off Line" indicates the status, in which the upper logical device fails so that it cannot be accessed from the host computer 100 or the AA.

In this embodiment, it is assumed for simplicity that, in advance at the shipping time of the storage 130, the lower logical device is assigned to the physical device produced in the disk device 157 whereas the upper logical device is assigned to the lower logical device. Therefore, the entry 34 for the upper logical device assigned to the lower logical device has the initial value "Off Line", and but the upper logical device is not defined for the remaining upper logical devices so that the entry 34 has the initial value "Not Mounted".

In the entry 35, there are registered a port number, a target ID and a LUN. The port number to be registered herein is the information indicating what port of the ports 141 or the network controller 146 of the AA or whether or not the corresponding upper logical device is connected to, that is, the identifier formation of the port 141 to be used to access the corresponding upper logical device or the network controller 146 of the AA. Here, the identifier information of the port 141 or the network controller 146 of the AA is the unique number in the storage 130, as assigned to each port 141 and the network controller 146 of the AA. In the entry 35, there is recorded the number of the port 141 or the network controller 146 of the AA, in which the upper logical device is LUN-defined.

Moreover, the target ID and the LUN are the identifiers for identifying the upper logical device. In this embodiment, as the identifier for identifying the upper logical device, there are used the SCSI-ID and the logical unit number (LUN) which are used in case the device is accessed in the SCSI protocol from the host computer 100 and the AA.

In the entry 36, there is registered the host name for identifying the host computer 100 or the AA, which is allowed to access to the upper logical device. The host name may be exemplified by such a value, e.g., the WWN (World Wide Name) or the iSCSI given to the port 107 of the host computer 100 as can identify the host computer 100 or the port 107 and the AA uniquely. In addition, the storage 130 holds the management information on the attributes, such as the WWN of each port 141), the MAC (Media Access Control) address or the IP address.

The entry 37 is stored with the values of "through CA", "Direct PA" or "To Direct PA", which indicate the processing mode of the input/output request for the upper logical device.

The "through CA" indicates the processing mode, in which the upper logical device is not made to correspond to the external device, or in which the upper logical device is made to correspond to the external device and in which the input/output request at the CA 150 is necessary for the input/output request to the upper logical device.

The "Direct PA" indicates the processing mode, in which the upper logical device is made to correspond to the external device and in which the input/output request for the upper logical device can be transferred directly between the PAs not through the CA.

The "To Direct PA" indicate the transient status, in which the external device access mode is switched from the "through CA" to "Direct PA", namely, that the later-described switching operation is being executed in the corresponding CA.

The entry 38 is set with the ID number of the external device, in case the upper logical device is made to correspond to that external device, but otherwise with the invalid value.

In the entry 39, there is registered the reconfiguration management pointer. The reconfiguration management pointer is used in case the upper logical device is in the "To Direct PA", and is the information indicating the leading address of such a storage area belonging to th upper logical device as indicates the leading address of the area where the access mode switching operation of the external access is not completed. Here, the entry 39 may be omitted in case the "To Direct PA" operation is not done.

Figure 4:
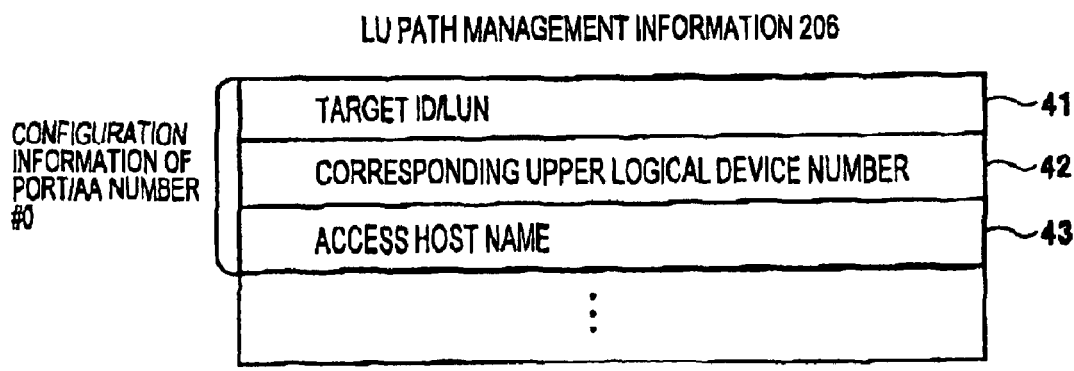
FIG. 4 is a diagram showing one example of LU path management information.

FIG. 4 is a diagram showing one configuration example of the LU path management information 206. This LU path management information 206 is provided with information holding entries 41 to 43 for every effective LUN that is defined for the individual ports 141 belonging to the PA or the network controller 146 of the AA. The entry 41 is stored with the address of the LUN, which is defined for (or assigned to) the port 141 or the network controlled 146 of the AA.

The entry 42 is stored with the number of the upper logical device, to which the LUN is assigned. In the entry 43, there is registered the information indicating the host computer 100 or the AA allowed to access the LUN, such as the number of the WWN or the network controller 146.

Here, the ports 141 or the network controllers 146 of the AA is defined for (or assigned to) one upper logical device, which may be accessed from the ports 141 or the AAs. In this case, the union of the values registered with the entry 43 of the LU path management information 206 on th individual LUNs of the ports 141 or the AA is held in the entry 36 of the upper logical device management information 203 on the upper logical device.

Figure 5:
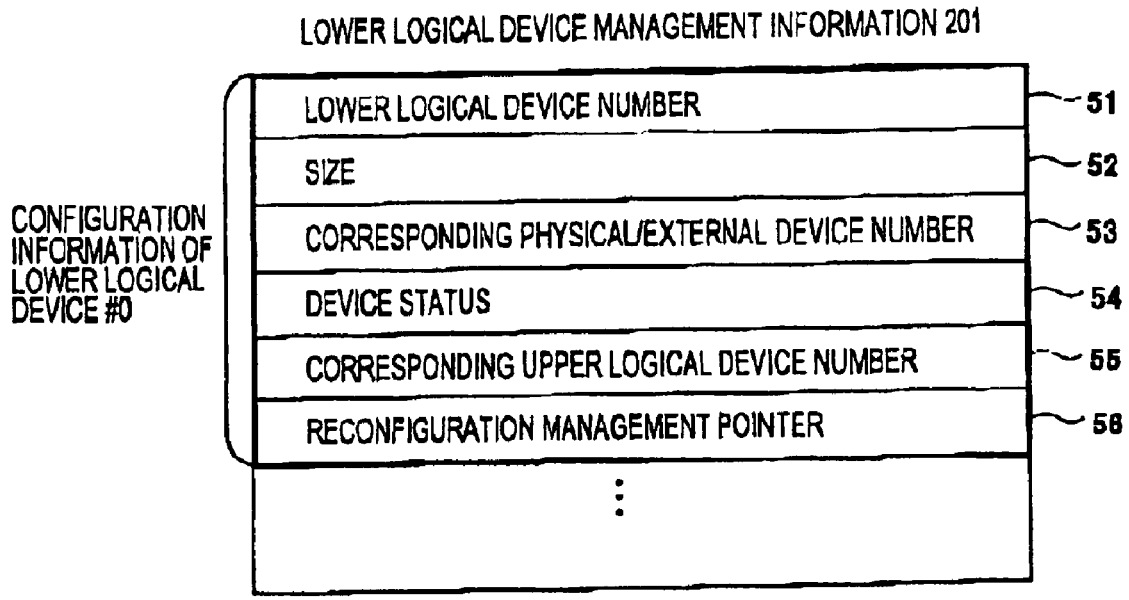
FIG. 5 is a diagram showing one example of a lower logical device management information.

FIG. 5 is a diagram showing one configuration example of the lower logical device management information 201. Each CA is provided for each lower logical device belonging to itself with entries 51 to 56 for registering a set of pieces of information from the lower logical device number to the corresponding upper logical device number. Here may be omitted the entry 56, in case the reconfiguration management pointer is not used.

In the entry 51, there is registered an ID number for identifying the corresponding lower logical device. The entry 52 is stored with the storage capacity of the lower logical device decided with the entry 51.

The entry 53 is stored with the ID number of the physical device of the CA or the ID number of the external device existing the external storage 180 which is made to correspond to the lower logical device. The entry 53 is set with the invalid value, in case neither the physical device nor the external device is assigned to the lower logical device. Here, the device number to be registered in the entry 53 coincides with either the physical device management information 202 held by the CA managing the lower logical device or the entry number of the external device management information 205 held by the MA.

The entry 54 is set with the information indicating the status of the lower logical device. The contents or the set information are identical to those of the entry 34 of the upper logical device management information 204 so that their description will be omitted. The entry 55 is set with the upper logical device number corresponding to the lower logical device.

In the entry 56, there is registered the reconfiguration management pointer. This pointer is identical to the reconfiguration management pointer of the upper logical device management information 204, and is the information which is used in case the upper logical device corresponding to the lower logical device is the "To Direct PA" and which indicates the leading address of such a storage area of the lower logical device corresponding to the upper logical device being transferred that the path reconfiguration program of the external access is not completed.

Figure 6:
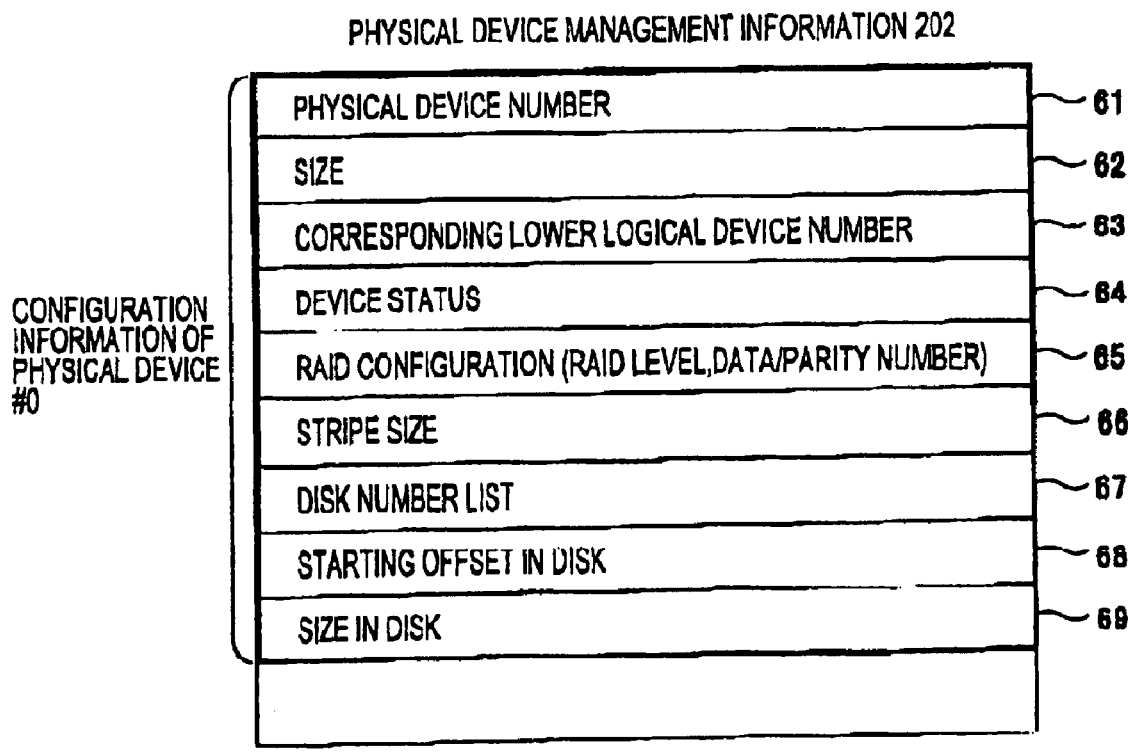
FIG. 6 is a diagram showing one example of physical device management information.

FIG. 6 is a diagram showing one configuration example or the physical device management information 202 for managing the physical device which is configured of the disk device 157 of the CA. Each CA is provided for each physical device of itself with entries 61 to 69 for holding a set of pieces of information of the in-disk size from the physical device number.

In the entry 61, there is registered an ID number for identifying the physical device. The entry 62 is stored with the storage capacity of the physical device, which is decided with the value registered in the entry 61. The entry 63 is stored with the number of the lower logical device corresponding to the physical device. The entry 63 is set with the invalid value, in case the physical device is not assigned to the lower logical device.

The entry 64 is set with the information indicating the status of the physical device. As this status, there exist the "On Line", the "Off Line", the "Not Mounted" and the "Failure Off Line". The "On Line" indicates the status, in which the physical device runs normally and is assigned to the lower logical device. The "Off Line" indicates the status, in which the physical device is defined and runs normally but is not assigned yet to the lower logical device. The "Not Mounted" indicates the status, in which the physical device is not made to correspond to the disk device 157. The "Failure Off Line" indicates that the physical device has failed to have no assignment to the lower logical device.

Here in this embodiment, it is assumed for simplicity that the physical device is so produced in advance at the shipping time as to correspond to the disk device 157 and is assigned to the lower logical device, too. On the available physical device, therefore, the entry 64 has an initial value in the "on Line" status and takes the "Not Mounted" status in other cases.

In the entry 65, there are held the pieces of information on the RAID level of the disk device 157, to which the physical device is assigned, or the RAID configuration such as the data disk or the parity disk number. Likewise in the entry 66, there is retained a data division unit (or stripe) length in the RAID. In the entry 67, there are held the ID numbers of the individual disk devices 157 configuring the RAID, to which the physical device is assigned. This ID number of the disk device 157 is a unique value given for identifying the disk device 157 in the CA.

In the entry 68 and the entry 69, there are registered the pieces of information (e.g., the starting offset and the size) indicating what area in each disk device 157 the physical device is assigned. For simplicity, in this embodiment, the offset and size in the individual disk devices 157 configuring the RAID are unified for all the physical devices.

Figure 7:
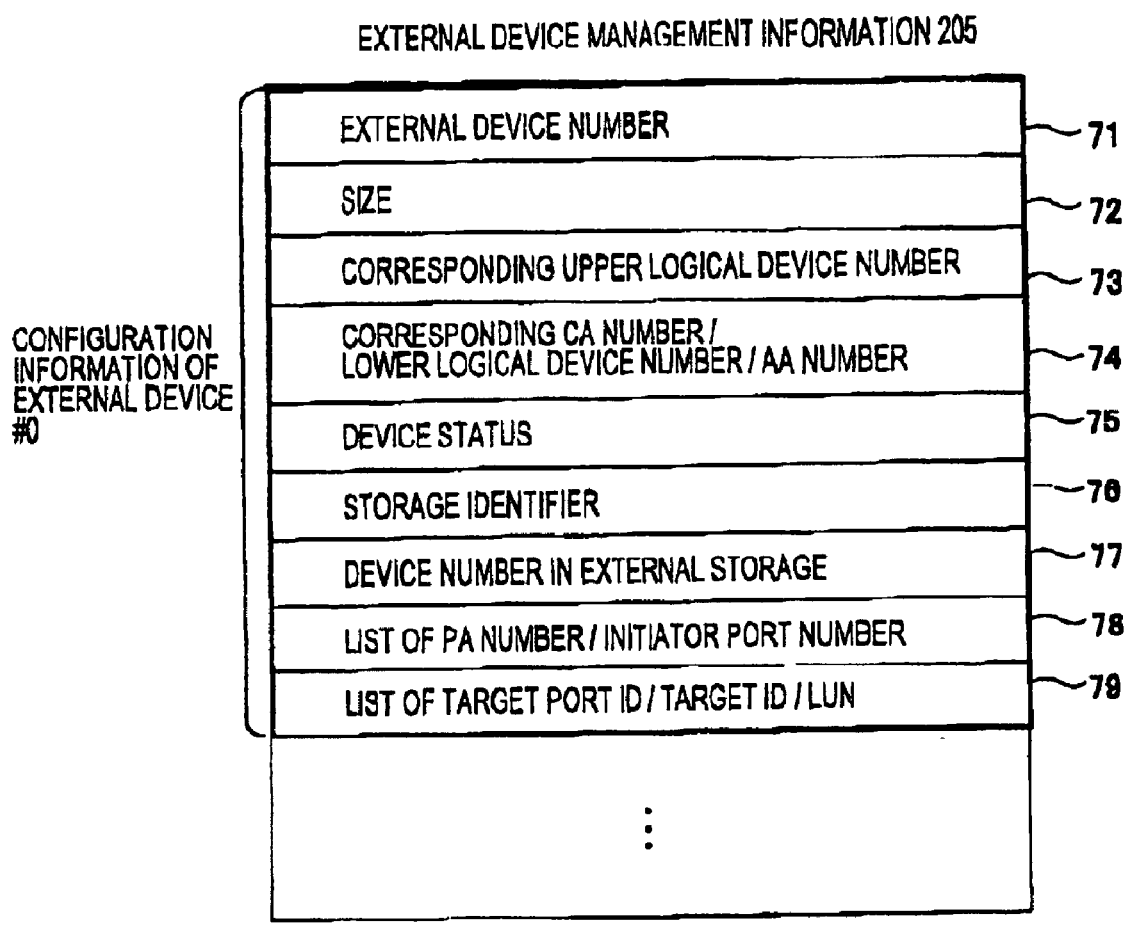
FIG. 7 is a diagram showing one example of external device management information.

FIG. 7 is a diagram showing one configuration example of the external device management information 205, for managing the external device of the external storage 180 connected to the storage 130. The MA of the storage 130 is provided, for each external device belonging to the external storage 180, with entries 71 to 79 for holding a set of pieces of information from the external device number to the target port ID/target ID/LUN list.

The entry 71 is stored with such an unique value in the storage 130 as has been assigned by the MA of the storage 130 to the external device. The entry 72 is stored with such a storage capacity of the external device as is decided with the value registered in the entry 71.

In the entry 73, there is registered the number of such an upper logical device in the storage 130 as is made to correspond to the external device. The entry 74 is stored with the number of the CA of the storage 130, which is made to correspond to the external device and processes the access request from the host computer 100 to the external device, and the number of the lower logical device made to correspond to the external device. In case the AA uses the external device directly, on the other hand, the entry 74 is stored with not the number of the CA but the number of the AA. Here, the entry 73 or the entry 74 is set with the invalid value, in case the upper logical device or the lower logical device is not assigned to the external device or is not directly used by the AA.

The entry 75 is set with the information indicating the status of the external device. The kinds of the individual statuses are identical to those of the entry 64 of the physical device management information 202. The storage 130 is not connected to the external storage 180 in the initial state so that the entry 75 takes the "Not Mounted" as the initial value. In the entry 76, there is registered the ID information of the external storage 180 having the external device. As the ID information of the external storage 180, there can be conceived the combination between the vendor ID information of the external storage 180 and the production serial number which is uniquely assigned by each vendor.

The entry 77 is stored with the ID number of the device, which has been assigned by the external storage 180 having the external device to the external device. Here, the external device is the logical device of the external storage 180 so that the entry 77 is stored with the logical device number in the external storage 180.

In the entry 78, there are registered the ID number, which has been assigned to the port 141 of the storage 130 accessible to the external device, and the ID number of the PA, to which the port 141 belongs. A plurality of port ID numbers and a plurality of PA ID numbers are registered, in case the external device can be accessed from a plurality of ports 141.

In the entry 79, there are held the port IDs of one or more ports 181 of the external device and one or more target ID/LUNs assigned to the external device, in case the external device is LUN-defined in the ports 181 in the external storage 180. In case the PA of the storage 130 accesses the external device (i.e., in case the input/output request is transmitted from the PA to the external device), the target ID and the LUN, which are assigned to the external device by the external storage 180 having the external device are used as the information for identifying the external device.

Figure 16:
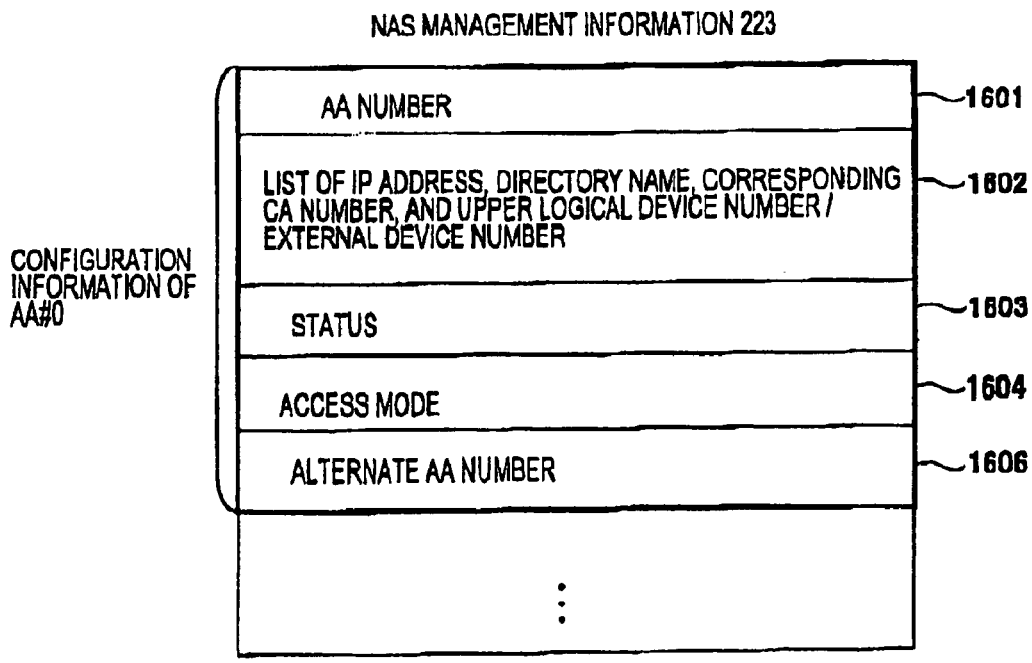
FIG. 16 is a diagram showing one example of NAS management information.

FIG. 16 is a diagram showing one configuration example of the NAS management information 223. This NAS management information 223 is provided for each AA with entries 1601 to 1606 for registering a set of pieces of information of the AA number to the alternate AA number.

In the entry 1601, there is registered the ID information for identifying the AA in the storage 130.

In the entry 1602, there is registered a list of information of a set of: an IP address for designating the transmission destination at the time for the host computer 100 to transmit the file accessing communication command; a directory name having a file to be managed by the AA; the number or the upper logical device or the external device assigned for storing the information of the directory designated with the directory name and the file existing under the directory, and the number of the CA providing the AA with the upper logical device. Here, the IP address may be exclusively registered so that all the requests to the registered IP address may be processed by the AA.

In case a plurality of IP addresses are registered in the entry 1602, a plurality NASes look from the host computer 100 as if they are in the system.

On the other hand, a plurality of AA can be assigned to one IP address thereby to process the different directories individually by setting the entry 1602. By setting the entry 1602, moreover, a plurality of upper logical devices can be used separately for every directory by the AA.

In the entry 1603, there is registered indicating the processing state of the AA. This registered information includes three: "Off Line", "Failure" and "On".

The "Off Line" indicates the status, in which the AA is being initially set or inheriting the information from another AA so that it cannot accept a request from the host computer 100.

The "Failure" indicates the status, in which the AX has failed.

The "On" indicates the status, in which the AA can accept a request from the host computer 100.

In the entry 1604, there is registered the information indicating the access mode of the AA. The information indicating the access mode indicates whether or not the AA cooperates with another portion (the CA or the PA) for operations, and is divided into two kinds: "Cooperation" and "Uncooperation".

When the "Uncooperation" is set, all the commands and data on the processing of the AA pass through the AA. Specifically, the command received from the host computer 100 by the PA is transmitted to the AA, and the AA transmits the input/output request, if necessary, to the external storage 180 through the CA or the PA. Moreover, the response command and data are transmitted from the CA or PA to the AA. After the processing ends, the AA transmits the response command to the PA which received the command from the host computer 100.

When the "Cooperation" is set, the data, which are based on the input/output request of the AA and which are transmitted from the external storage 180 connected through the CA or the PA, are transmitted directly not through the AA from the host computer 100 to the PA having received the command, and the data, which are transmitted to the external storage 100 connected through the CA or the PA, are transmitted from the PA having received the command from the host computer 100, either directly to the CA or the PA connected to the external storage 180. As a result, many data do not pass through the AA thereby to lighten the processing load of the AA and the load on the internal network 170. Here in this embodiment, for simplicity, it is assumed that the entry 1604 is set in advance at the shipping time of the storage 130 with the "Uncooperation", and that the value is suitably changed later under the control of the management server or the storage manager by using the later-described means. The "Cooperation" is adopted in the environment, in which many accesses are made to the file or a large size, by the storage manager so as to lighten the processing load. Here, the entry 1604 may be omitted to provide either the "Cooperation" or "Uncooperation" as the AA.

In case the AA fails, the entry 1606 is set with the number of the alternate AA, which processes by inheriting the management information of the AA. Without this alternate AA, the entry 1606 is set with the invalid value. The entry 1606 may be omitted, in case the alternate AA is not provided.

Figure 17:
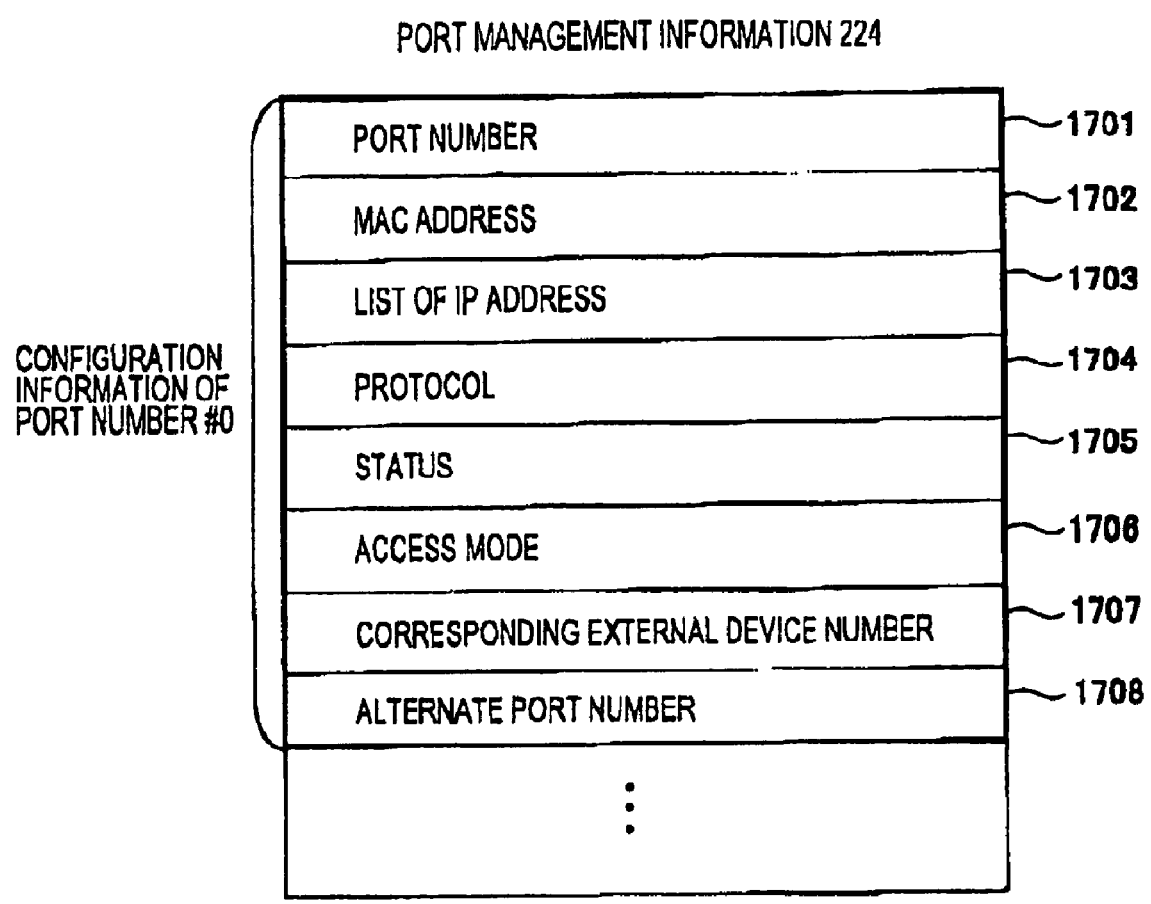
FIG. 17 is a diagram showing one example of port management information.

FIG. 17 is a diagram showing on, configuration example of the port management information 224. This port management information 224 is used in each potion such as the MA, when the port 141 is managed on its access status in case it is connected to the IP network. Incidentally, the port 141 is not managed by the port management information 224, in case it is connected to the FC network. The port management information 224 is provided, for every ports connected to the IP network, with entries 1701 to 1708 for registering the pieces of information on those ports.

The entry 1701 is set with the number, which is assigned so that the port 141 may be uniquely identified in the storage 130. In the entry 1702, there is registered the MAC address of the port 141. In the entry 1703, there is registered the list of the IP address assigned to the port 141. In the entry 1704, there is registered the list of the protocol (e.g., the iSCSI or the NFS), which can be processed by the port 141. This port 141 performs the communications in accordance with the MAC address 1702, the IP address 1703 and the protocol 1704, which are registered in the entry of the port 141 itself. Here, the data of the unprocessible protocol are disposed at the port 141, in case the port 141 receives the data.

In the entry 1705, there is registered the status of the port 141. This status is divided into four kinds: "Communicable", "Network Not Accessed", "Incommunicable" and "Failure".

The "Communicable" indicates the status, in which the port 141 has no failure and is connected to the network so that it can communicate with the host computer 100. The "Network Not Accessed" indicates the status, in which neither a cable nor a network is connected to the port 141. The "Incommunicable" indicates the status, in which the port 141 is connected to the network but is made unable to communicate with the host computer 100 because of the problem of the network. The "Failure" indicates the status, in which the port 141 fails.

In the entry 1707, there is registered the external device number or the external storage 180 connected to the port 141, in case the port 141 is connected to the external storage 180. The entry 1707 is set with the invalid value, in case the port 141 is not connected to the external storage 180.

In the entry 1708, there is registered the port number of the port 141 (hereinafter referred to as "alternate port"), which inherits the list 1703 of the IP address assigned to the port 141 and continues the access to the IP address in case the port 141 fails. Here, in the inheriting operation of the case in which the alternate port is not used for the communications, not only the list of the IP address but also the MAC address may be inherited to the alternate port.

Here, in case the port corresponding to the FC protocol is managed with the port management information 224, in addition to the aforementioned pieces of information; the WWN is registered in the entry 1702; the port ID is registered in the entry 1703; and the information indicating the FC is registered in the entry 1704.

In the following, here will be described the processing procedure in the storage 130 in case the host computer 100 makes a file access to the storage 130. The file access program is specifically configured of a request switching program, a file accessing program, a cooperative mode program, a command processing program and an asynchronous destaging program. These programs will be sequentially described in the following.

Figure 11:
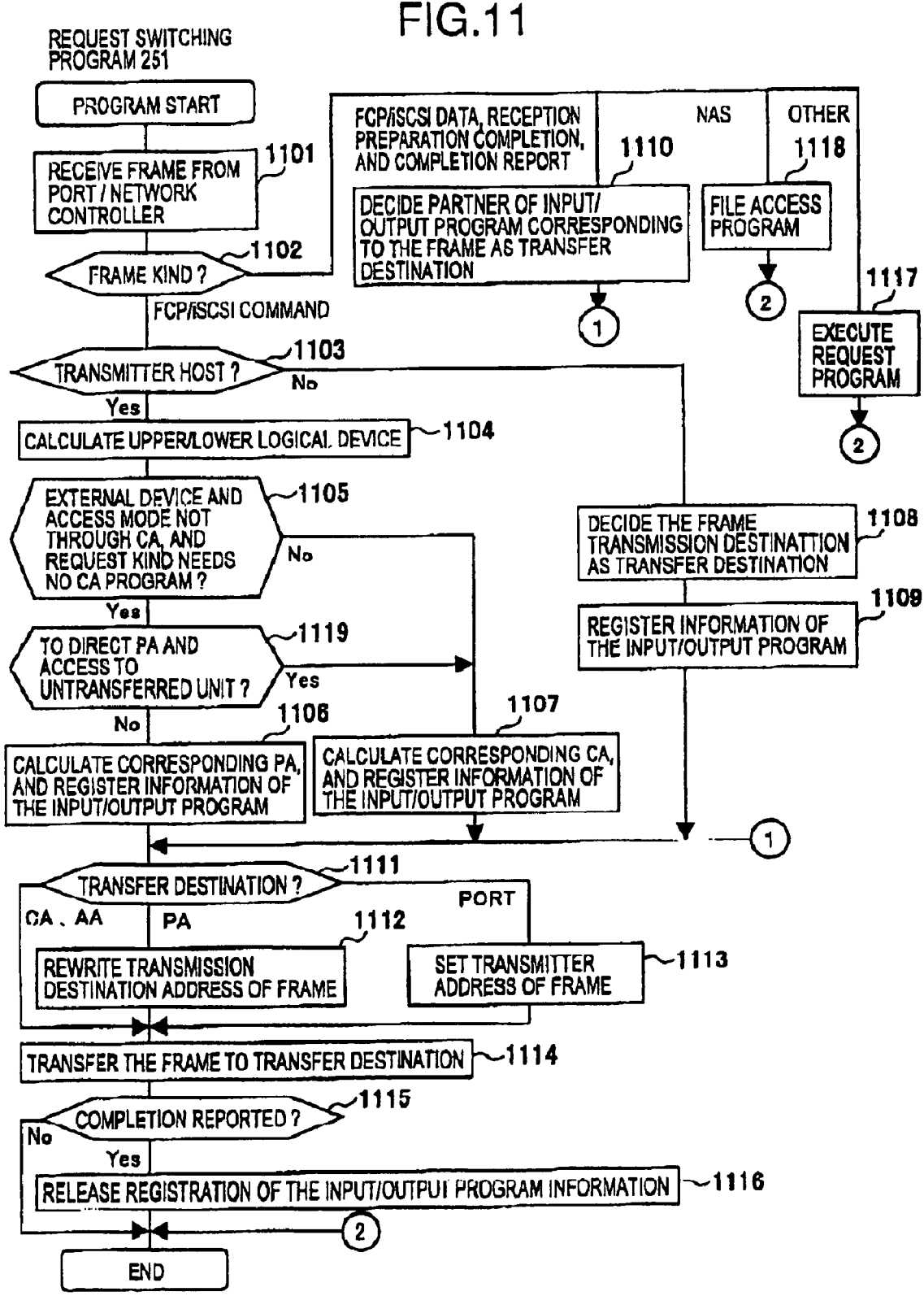
FIG. 11 is a diagram showing one example of a request switching program.

FIG. 11 is a diagram showing one example of the processing flow of the request switching program 251. In the request switching program 251, the PA switches th input/output request or data, which is received from the host computer 100 or the external storage 180 at the port 141 or the PA, and the input/output request, data and command, which is received from the CA, the AA or another PA at the network controller 144, to the proper objective portion such as the CA, the AA, another PA, the host computer 100 or the external storage 180.

The PA having received (at Step 1101) the frame containing the data and command from the port 141 or the network controller 144 divides the program according to the kind of the protocol in the frame and the kind of the command of the protocol. Here, the kind of the protocol can be identified (at Step 1102) from the network (e.g., the IP or the FC) supported by the port 141 and the data received in the frame.

In case the frame is the FCP command frame or the iSCSI command, the PA divides the program according to the transmitter of the frame. Here in this embodiment, the command frame is received (at Step 1103) either from the host computer 100 through the port 141 or from the CA, the AA or another PA accessing the external storage 180 through the network controller 144.

At first, in case the transmitter is the host computer 100, the PA refers to the copy 216 of the LU path management information and the copy 214 or the upper logical device management information on the basis of the LUN indicating the upper logical device or the access objective contained in the header information or the received command, and judges whether or not the upper logical device is made to correspond to the external device and whether or not the device access mode is the "through CA". In case the upper logical device is made to correspond to the external device and in case the device access mode is the "Direct PA", the PA further judges whether the request kind of the command requests no processing at the CA. In case all of these conditions are satisfied, the PA judges that the access mode of the request is the direct PA. In case any condition is dissatisfied, the PA judges that the access mode or the request is the through CA (at Steps 1104 to 1105).

In case it is judged at Step 1105 that the access mode is not the "through CA" and that the command request kind does not need the CA operation, the PA judges (at Step 1119) whether or not the access mode is the "to Direct PA" and whether or not the access area indicated by the in-command LBA and the block number is located after the reconfiguration management pointer of the upper logical device. In case the access mode is not the "to Direct PA" or in case the command received by the PA is before the reconfiguration management pointer, that is, the area switched to the direct PA is targeted, the PA accesses (at Step 1106) the access destination of the command with the external storage 180 having the external device.

In case it is judged at Step 1119 that the access mode is the "to Direct PA" and that the access destination is an unswitched portion and in case the "through CA" access in judged at Step 1105, the PA refers to the copy 214 of the upper logical device management information to calculate (at Step 1107) the CA number, to which the upper logical device or the access destination of the received command corresponds, and stores the calculated CA number as the routing control information of the command by using the CA number as the receiver of the input/output operation and the transmitter of the frame as the requester of the input/output operation.

Here, in the case the "to Direct PA" operation is not done, Step 1119 may be omitted. In this case, the entry 39 of FIG. 3 is omitted.

In case the transmitter of the frame is other than the host computer 100, namely, the CA, the AA or another PA 140 in the dividing operation of Step 1103, on the other hand, the PA decides the external device of the external storage 180 designated with the header information of the frame as the transfer destination, and registers (at Steps 1108 and 1109) the routing control information of the command by using the decided external device as the receiver of the input/output operation and the transmitter of the frame as the requester of the input/output operation.

At the dividing operation of Step 1102, on the other hand, in case the kind of the frame received by the PA 140 is the data frame, the reception preparation completion notifying frame or the completion reporting frame, the PA refers to the routing control information of the input/output operation corresponding to the frame, to decide the communication partner of the transmitter portion of the frame as the transfer destination of the frame. That is, in case the PA receives the frame from the external storage 180, the PA, the CA or the AA, with which the host computer 100 or the receiver of the input/output operation is accessed is the transfer destination of the frame. In case the PA receives the frame from the host computer 100, on the other hand, either the CA requesting the input/output operation or the PA connected to the external storage 180 is decided as the transfer destination of the frame. In case the PA receives the frame from the CA or another PA, moreover, the host computer 100 or the external storage 180, namely, the communication partner (or the receiver if the transmitter of the frame is the requester of the input/output operation) of the input/output operation is decided (at Step 1110) as the transfer destination of the frame.

When the transfer destination of the received frame is decided at Steps 1106, 1107, 1109 and 1110, the PA divides (at Step 1111) the operation in dependence on the transfer destination portion.

In case the transfer destination is another PA, the PA sets the transmission destination address or the frame with the address of the transfer destination which is registered in the routing control information of the input/output request. Specifically, in case th transmission destination is the external device, the PA rewrites the destination ID of the received frame into the target port ID (i.e., the port ID of the port 181) of the external device, which is registered as the receiver of the input/output operation in the routing control information, and the address information of the LUN in the same frame into the address (i.e., the LUN or the like acquired with reference to the external device management information) of the external device. In case the transmission destination is the host computer 100, the PA rewrites (at Step 1112) the destination ID of the received frame into the port ID of the port 107 of the host computer 100, which is registered in the routing control information as the requester of the input/output operation).

In case the transfer destination is the host computer 100 or the external storage 180 connected to the port 141 in the PA, on the other hand, the PA sets (at Step 1113) the address of the port 141 to the transmitter address of the frame.

And, the PA having received the command, the data, the reception preparation completion report and the completion report frame transfers (at Step 1114) the frame to the host computer 100 or the decided transfer destination, the external storage 180, the CA, the AA or another PA. In case the frame having completed the transfer is the completion reporting frame, moreover, the PA releases (at Steps 1115 and 1116) the registration of the routing control information of the input/output operation.

In case it is judged at Step 1102 that the frame received by the PA is the command of the NAS, i.e., the command of the file access, on the other hand, the PA retrieves the copy 221 of the NAS management information on the basis of the directory information obtained from the IP address set in the frame header and the file name set in the command, determines the AA to process the command and transfers the command to the AA. Next, the AA executes the file access program 229 (at Step 1118). This file access program 229 will be described in detail hereinafter.

In case it is judged at Step 1102 that the frame received by the PA is neither the frame relating to the FCP or the iSCSI nor the command of the NAS, on the other hand, the program known in the art is executed (at Step 1117) as the node port of the fiber channel in the control processor 142 of the frame received PA, if the frame is that of the FC, and the PA discards the frame if the frame is that of the IP.

Here, in cage the transfer destination of the command is decided the CA or the AA as a result of the execution of the request switching operation, the PA adds not only the frame but also the information such as the CA number or the AA number to be accessed, the lower logical device number, the upper logical device number, or the external device number, the LBA or the size, and transmits them to the transfer destination CA or AA. In case the data or the like subsequent to the command is to be transferred to the CA or the AA, the data transfer is made at each network controller the PA, the CA or the AA while being conscious of the already established command sequence.

Figure 21:
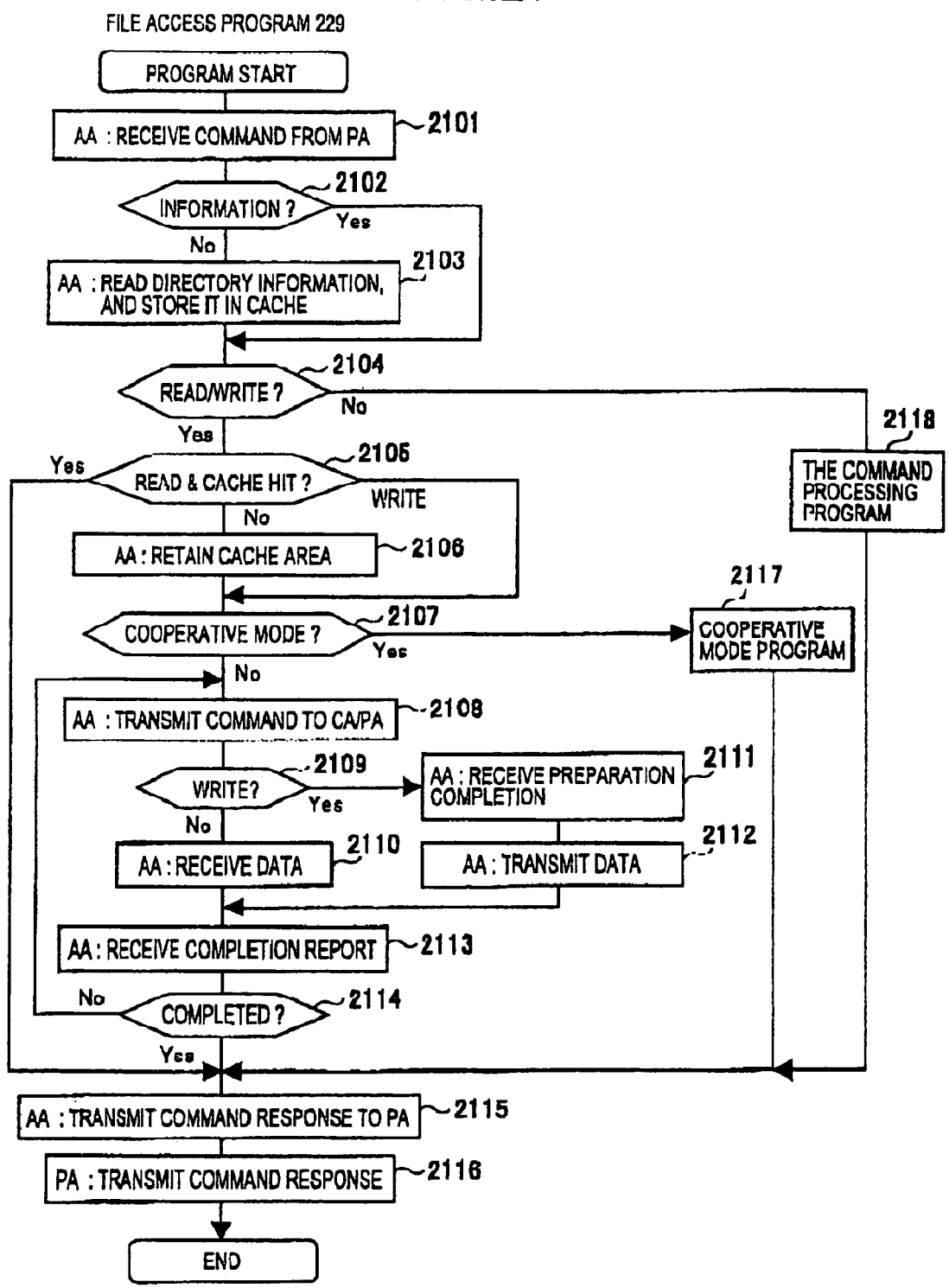
FIG. 21 is a diagram showing one example of a file access program.

FIG. 21 is a diagram showing one example of the processing flow of the file access program 229. As a result of the request switching program 251, the AA receives (at Step 2101) the command from the PA. The AA checks (at Step 2102) it with cache management information 230 whether or not the information on the file or the processing objective requested by the command has been cached by its own memory 149. In the absence of the information (e.g., the directory information) on the file of the processing objective, the AA refers the copy 227 of the NAS management information to read out (at Step 2103) the directory information from the device (i.e., the logical device or the external device provided by the CA) stored with the relating information, and stores the memory 149 with the directory information.

Either in the presence of information or after the information was read out and stored in the cache, the AA checks (at Step 2104) whether the request is to read or to write. In case the request is neither to read nor to write, the AA processes (at Step 2119) the command by using the existing technique.

In case the request is to read or to write, the AA checks (at Step 2105) whether or not the data is in the cache area of its own memory 149. In case the request is to read and in case the data has already been in the cache area of the memory 149, the AA executes the read operation on the basis of the data.

In case the request is to read and in case the data is not in the cache area of the memory 149, the AA retains (at Step 2106) the cache area in the memory 149. After the cache area was retained or in case the request is to write, the AA checks (at Step 2107) whether or not its own access mode is the "Cooperation".

If not the "Cooperation", in accordance with the contents of the command and the directory information, the AA transmits (at Step 2108) the input/output request to either the CA having the data recorded or the PA having the port 141 connected to the external storage 180. In case the transmitted command is the read request (at Step 2109), the AA receives (at Step 2110) the data from either the CA having executed the command processing program 254 or the PA having executed the request switching program 251, stores the cache area with the received data, and then receives (at Step 2113) the completion report.

In case the command transmitted at Step 2109 is the write request, the AA receives (at Step 2111) the preparation completion report from either the CA having executed the command processing program 254 or the PA having executed the request switching program 251, then receives the data (at Step 2112) and receives (at Step 2113) the completion report.

After this, on the basis of the received data, the AA checks either whether or not the read of the data for the operation requested by the command has been completed or whether or not the write of the data has been completed. In case not completed, the AA repeats the operations of Steps 2101 to 2114 till the read or write of the data is completed (at Step 2114).

In the case of the cooperation mode at Step 2107, the AA, the PA and the SA execute (at Step 2117) the cooperative mode program.

In case the operation is completed at Step 2105, after the operations of Step 2114, Step 2117 and Step 2118 were ended, the AA transmits (at Step 2115) the result as the command response to the PA that transmitted the command. The PA having received the command response transmits (at Step 2116) the command response to the host computer 100 or the command transmitter.

Here in this embodiment, the PA executes the operations up to the TCP/IP, and the command according to the protocol to be used for accessing the NAS such as the NFS is transferred between the PA and the AA.

On the other hand, this embodiment adopts the mode, in which the data accompanying the write request is written directly in the CA, but may adopt another mode, in which the data is once written in the cache area of the memory 149 of the AA and then in the CA at a suitable time. Moreover, this embodiment adopts the process, in which the AA requests either the CA or the PA connected to the external storage 180, for at least one read/write, but may adopt the mode, in which the indication method is predetermined among the CA, the PA and the AA so that the operations may be ended by one read/write request.

Figure 22:
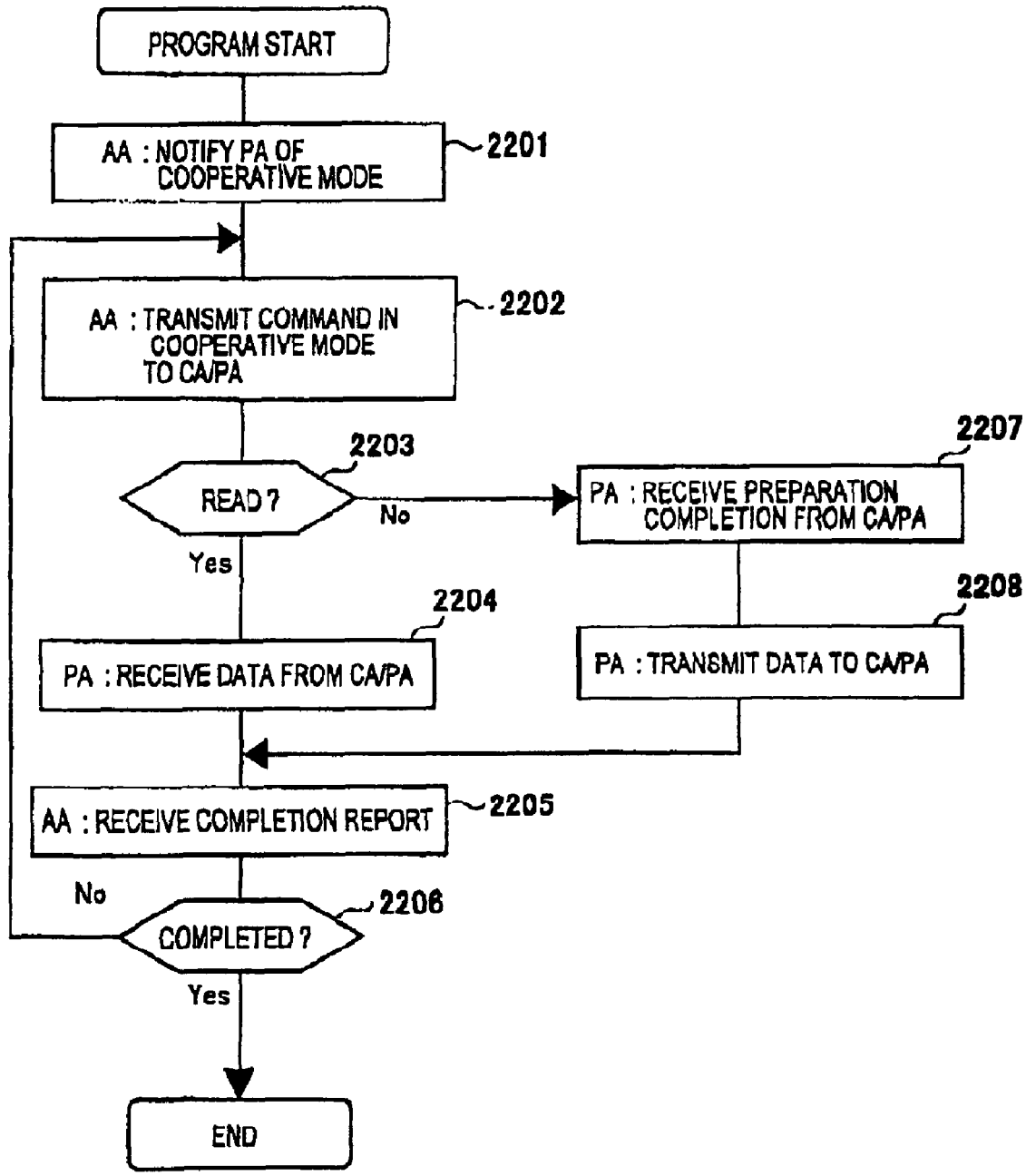
FIG. 22 is a diagram showing one example of a cooperative mode program.

FIG. 22 is a diagram showing one example of the processing flow of the cooperative mode program 2117 to be executed in the file access program 229. In the case of the cooperative program, the AA notifies (at Step 2201) the PA that transmitted the command of the operation in the cooperative mode. Next, the AA transmits (at Step 2202) either the CA for operating the device for the read or write or the PA having the port 141 connected to the external storage 180, of the read/write request in the cooperative mode.

In case what is transmitted is the read request (at Step 2203), the PA that transmitted the command receives (at Step 2204) the data from either the CA having executed the command processing program 254 or the PA having executed the request switching program 251, and the AA receives (at Step 2205) the completion report from either the CA having executed the command processing program 254 or the PA having executed the request switching program 251. In case the write request is at Step 2203, the PA that transmitted the command receives (at Step 2207) the preparation completion from either the CA having executed the command processing program 254 or the PA having executed the request switching program 251, and then transmits (at Step 2208) the data. After this, the AA receives (at Step 2205) the completion report from either the CA having executed the command processing program 254 or the PA having executed the request switching program 251.

The AA checks (at Step 2206) whether or not the read of the data for the operation requested by the command has been completed with the received data or whether or not the write of the data has been completed. In case not completed, the AA repeats the operations of Steps 2202 to 2206 till the read or write of the data is completed.

After completion of the data read or write, the AA returns to the processing flow of FIG. 21 and transmits (at Step 2115) the result as a command response to the PA that transmitted the command, and the PA creates the command response from the cooperative mode notice received from the AA, the data received from the PA or the CA, and the command response received from the AA, and transmit (at Step 2116) the command response to the host computer 100 or the command transmitter.

Figure 12:
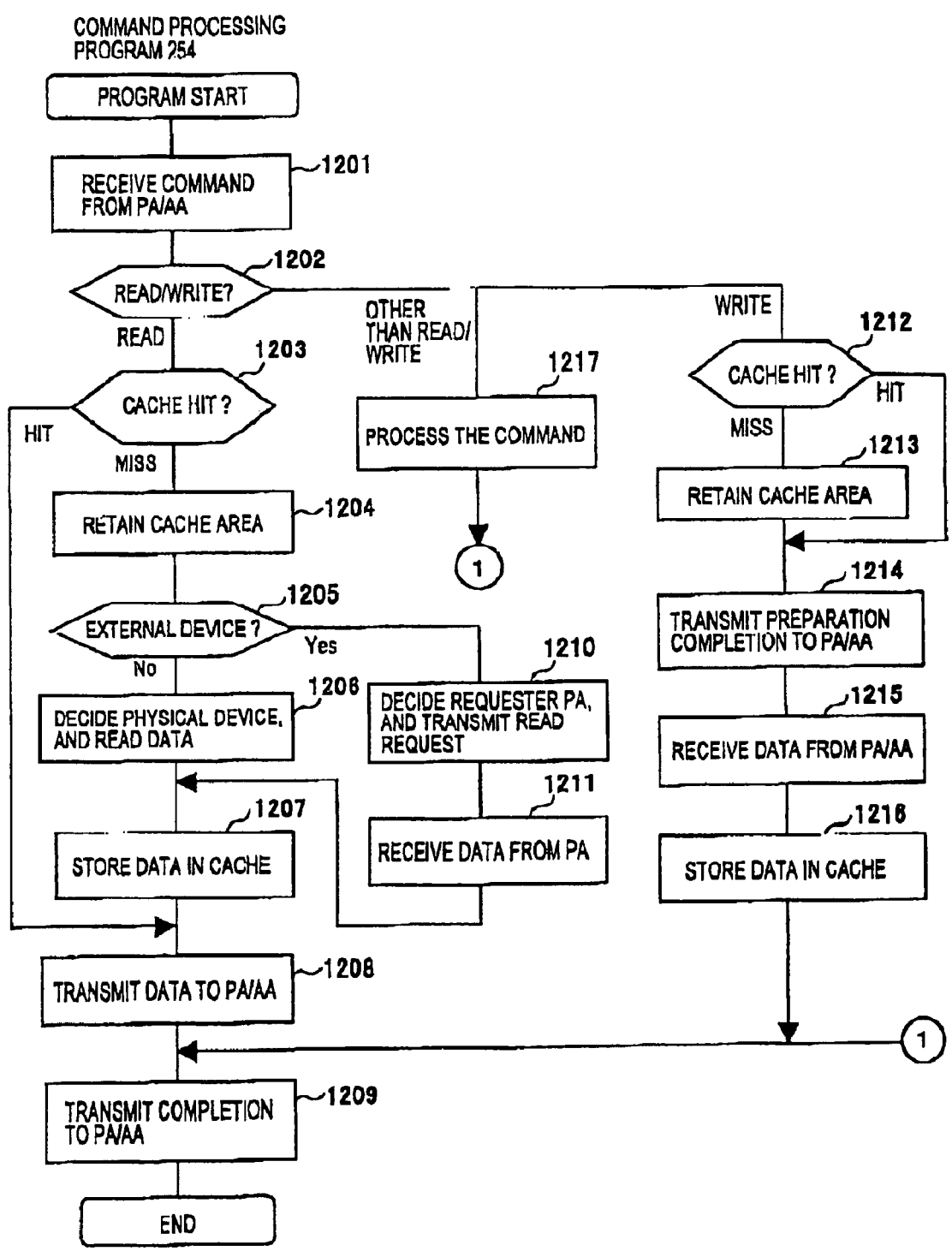
FIG. 12 is a diagram showing one example of a command processing program.

FIG. 12 is a diagram showing one example of the processing flow of the command processing program 254. This command processing program processes the input/output request for the lower logical device in the CA having received the read or write request.

As a result of the request switching program 251 or as a result of the file access program 229, the CA checks (at Step 1202) the command kind on the command received from the PA or the AA. In case the request of the command is to read, the CA judges (at Step 1203), with reference to the cache management information 203, whether or not the data to be read is hit on the disk cache 154 (or stored in the cache).

In the case of a cache miss, the CA updates the cache management information 203, retains (at Step 1204) an area in the disk cache 154, and read out the data to the cache from the physical device or the external device stored with the data. The CA is enabled to judge (at Step 1205) with reference to the lower logical device management information 201 whether the device stored with the read data is the physical device or the external device.

If the device stored with the read data is the physical device, the CA issues a read request to the disk device 157 decided by the physical device management information 202, to read out the data (at Step 1206), and steres (at Step 1207) the read data in the retaining area of the disk cache 154.

If the device stored with the read data is the external device, the CA decides, with reference to the external device management information 205, the access target PA from the entry 78, and transmits (at Step 1210) the read request for the external device to the PA.

The PA having received the read request transmits the read request to the external storage 180 by the request switching program 251, receives (at Step 1211) the read data as a response from the external storage 180, and returns the read data received from the external storage 180, to the CA. The CA stores the read data received from the PA, in the retaining area of the disk cache 154.

If the data exists in the disk cache or if the read data is stored in the disk cache; the CA transmits (at Step 1208) the data stored in the disk cache 154, to the PA or the AA that transmitted the command; the PA executes the request switching program 251 to transfer the data to the host computer 100; and the AA performs the continuation of the file access program.

In case the command received by the CA from the PA or the AA is to write, the CA judges (at Step 1212) whether or not the old data corresponding to the write data is stored in the disk cache 154. In the case or the cache miss, the CA assigns (at Step 1213) the area of the disk cache 154.

After the end of Step 1212 or 1213, the CA transmits (at Step 1214) transfer preparation completion to the PA or the AA that transmitted the command. In case the transfer preparation completion is transmitted to the PA, the PA having received this transfer preparation completion executes the request switching program 251 to transfer the transfer preparation completion to the host computer 100. When the write data is resultantly transmitted from the host computer 100, the PA transmits the data to the CA having transmitted the transfer preparation completion. In case the transfer preparation completion is transmitted to the AA, on the other hand, the AA having received the transfer preparation completion transmits the data to the CA. In the CA, the write data received (at Step 1215) from the PA or the AA is stored (at Step 1216) in the retained area over the disk cache 154.

In case the command received by the CA is neither to read nor to write, namely, a sense command such as a mode sense or a diagnostic command, the CA executes (at Step 1217) a proper processing on the basis of the specifications of a general SCSI storage.

The CA having ended the operation of Step 1208, 1217 or 1216 reports it to the PA or the AA connected to the host computer 100 or the command transferor that the command processing program has been completed. The PA having accepted the completion report executed the request switching program 251 and transmits the completion report frame to the host computer 100. The AA having received the completion report executes (AT Step 1209) the continuation of the file access program.

Here, in case the CA receives the command from the AA at Step 1201 and in case the AA operates in the "Cooperative" mode, the CA receives from the AA the notice of the cooperative mode and the information for designating the cooperative PA in addition to the command. In this case, the CA executes the preparation completion and the transmission/reception of the data at Step 1208 and Steps 1214 and 1215, for the PA instructed to cooperate. The PA operating in the "Cooperative" mode completes the file access program in the cooperative mode in accordance with the instruction from the AA, the preparation completion from the CA and the transmission/reception of the data.

Figure 13:
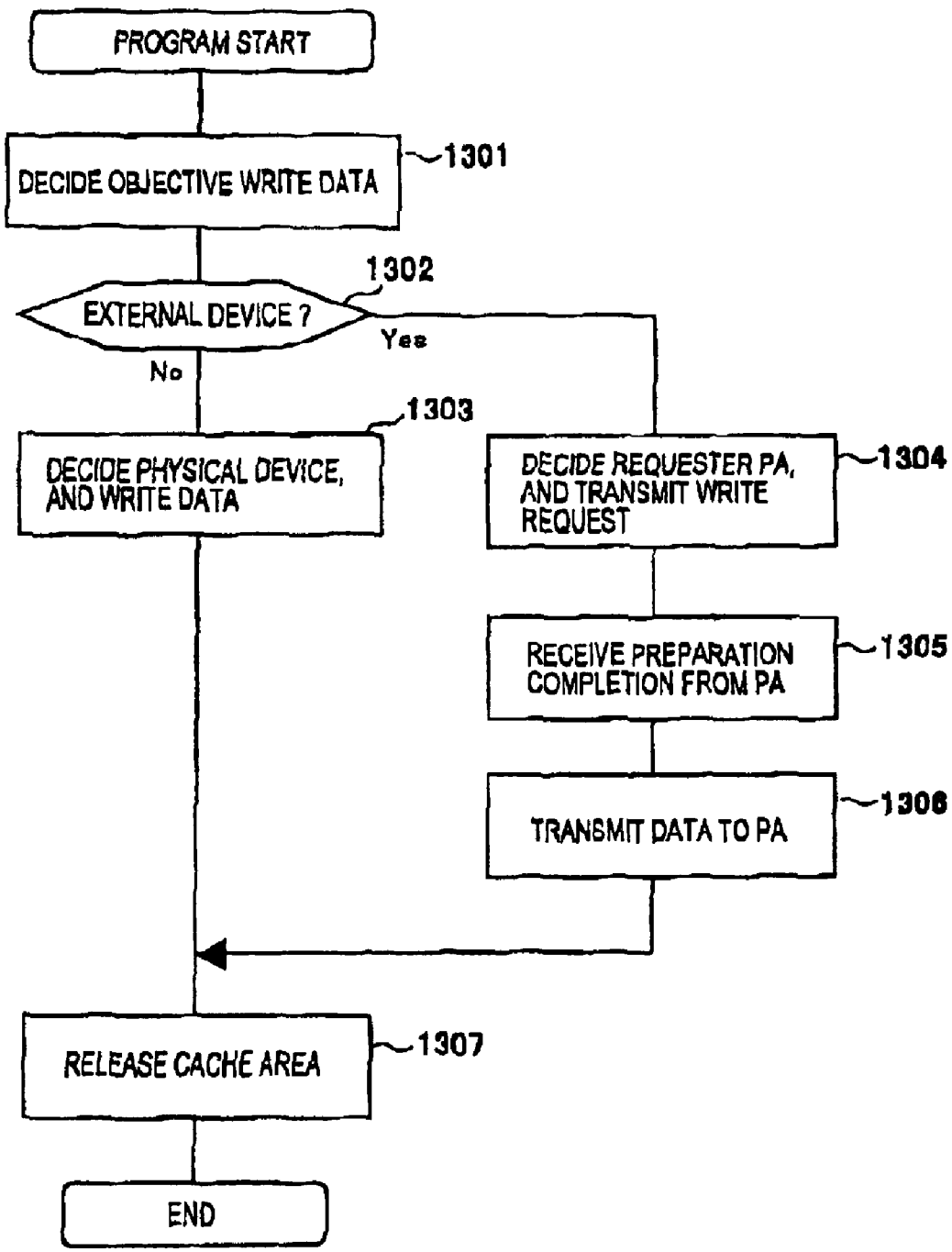
FIG. 13 is a diagram showing one example of an asynchronous destaging program.

FIG. 13 is a diagram showing one example of the processing flow of the asynchronous destaging program 257. In this asynchronous destaging program, as a result of the command processing program 254 in the CA, the CA writes out the write data stored in the disk cache 154, to the disk device 157. The write data held on the disk cache 154 is managed with the cache management information 203. Usually, either the write data or the read data read from the disk is so managed by queue that one as old as possible may be expelled from the disk cache 154.

The CA selects (at Step 1301) the data to be actually written in the disk device 157, from the data managed by the cache management information 203, and it is judged (at Step 1302) on the basis of the lower logical device management information 201 whether the disk device 157 stored with the data is made to correspond to the external device or the physical device.

In case the write data is to be written in the physical device, the CA decided (at Step 1303), with reference to the physical device management information 202, the disk device 157 to write the data, and transfers the write data to the decided disk device 157.

In case the write data is to be written in the external device, on the other hand, the CA decides (at Step 1304), with reference to the external device management information 205, the PA which is connected to the external storage 180 having the external device to write the write data, and transmits the write request to the PA. The PA having received the write request executes the request switching program 251, to transfer the write request to the external storage 180, and receives the transfer preparation completion notice as the response to the write request, from the external storage 180. Then, the PA transmits the transfer preparation completion notice to the CA that transmitted the write request. The CA having received the completion notice transmits (at Steps 1305 and 1306) the write data to the PA.

The PA having received the write data executes the request switching program 251 and transmits the write data to the aforementioned external storage 180, and the write data is written in the external device by the external storage 180.

After the write data was written in the physical device or the external device, the CA releases (at Step 1307) the area, which has been stored with the write data, over the disk cache 154.

Next, here will be described the operations of the storage 130 of the case, in which the port 141 of the AA or the PA fails. In case the port 141 of the AA or the PA fails, the storage 130 continues the programs by using the alternate AA or the port 141.

Figure 20:
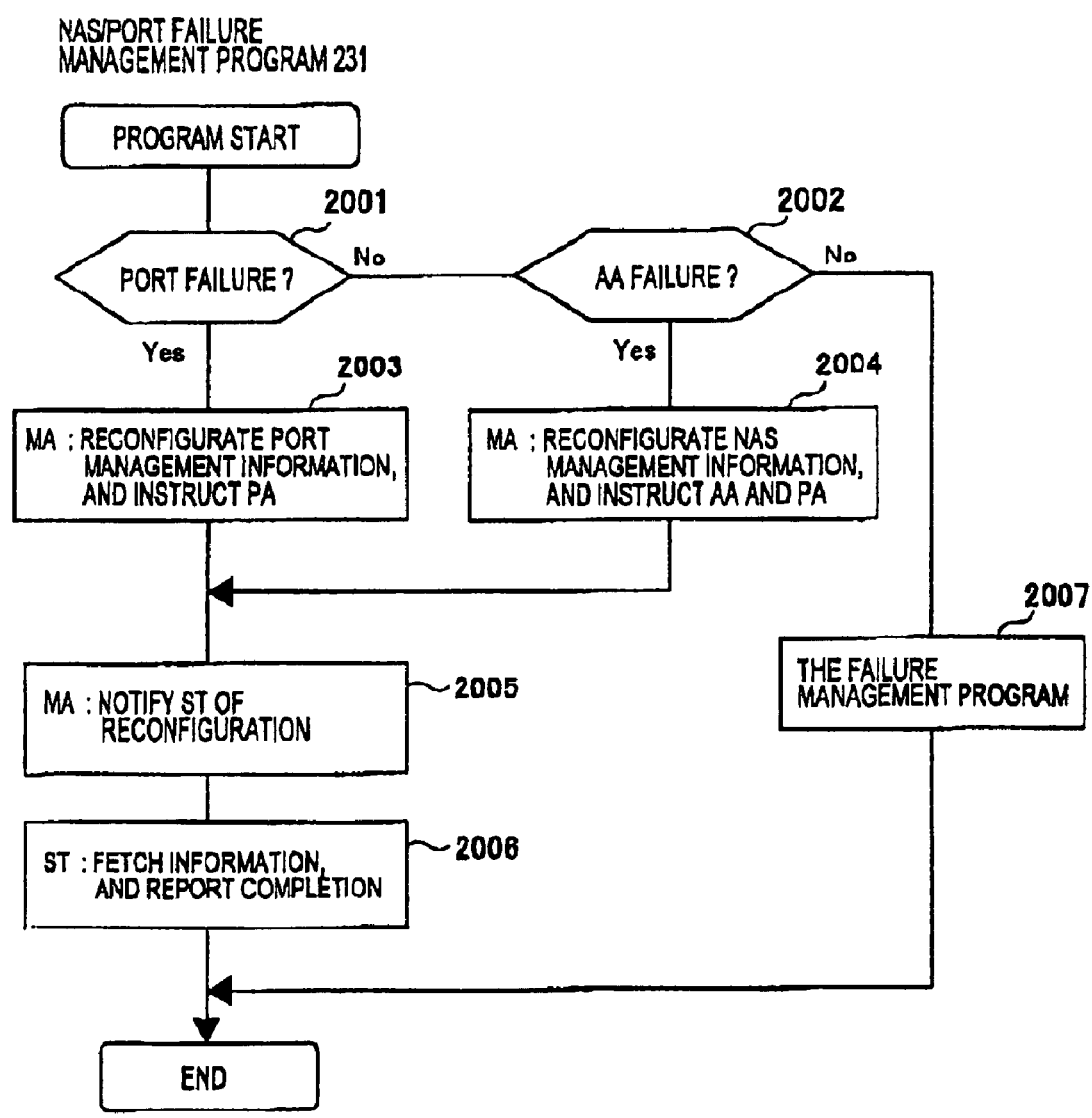
FIG. 20 is a diagram showing one example of a NAS/port failure management program.

FIG. 20 is a diagram showing one example of the processing flow of the NAS/port failure management program 231. The MA having detected or been notified from another portion of a failure of the port 141 or the AA judges (at Steps 2001 and 2002) whether the detected or notified failure is the port failure or the AA failure. In case the detected failure is the port failure, the MA sets, with reference to the port management information 224 of the port 141 having failed, the entry 1705 of the management information of the port 141 at the "Failure".

Next, the MA additionally copies the information of the port 141, which has failed in the port management information of the alternate port registered in the entry 1708. In case the entry 1705 of the alternate port is in the "Communicable" status, the IP address list registered in the entry 1704 of the port 141 having failed is added to the IP address list of the alternate port. In case the entry 1705 is not in the "Communicable" status, the MA copies the MAC address, the IP address list, the access mode and so on of the port 141 having failed are copied to the individual entries of the port management information corresponding to the alternate port. And, the MA instructs (at Step 2003) the PA the updating of the port management information.

In the case of the AA failure, the MA sets, with reference to the NAS management information 223 corresponding to the AA having failed, the entry 1603 of the management information 223 to the "Failure". Next, the MA adds the list or the IP address, the directory name, the corresponding CA number and the upper logical device/the external device of the AA having failed, to the NAS management information 223 of the alternate AA registered in the entry 1606 of the NAS management information 223 on the AA having failed. After this, the MA instructs (at Step 2004) the AA and the PA to update the NAS management information 223.

After the updating of the port management information and the NAS management information was ended at the MA, the PA and the AA, the MA notifies (at Step 2005) the ST of the port management information and the NAS management information. The ST notified of the updating of the port management information and the NAS management information fetches (at Step 2006) the updated information and then outputs the completion report to the requester such as the storage manager or the management server.

Figure 18:
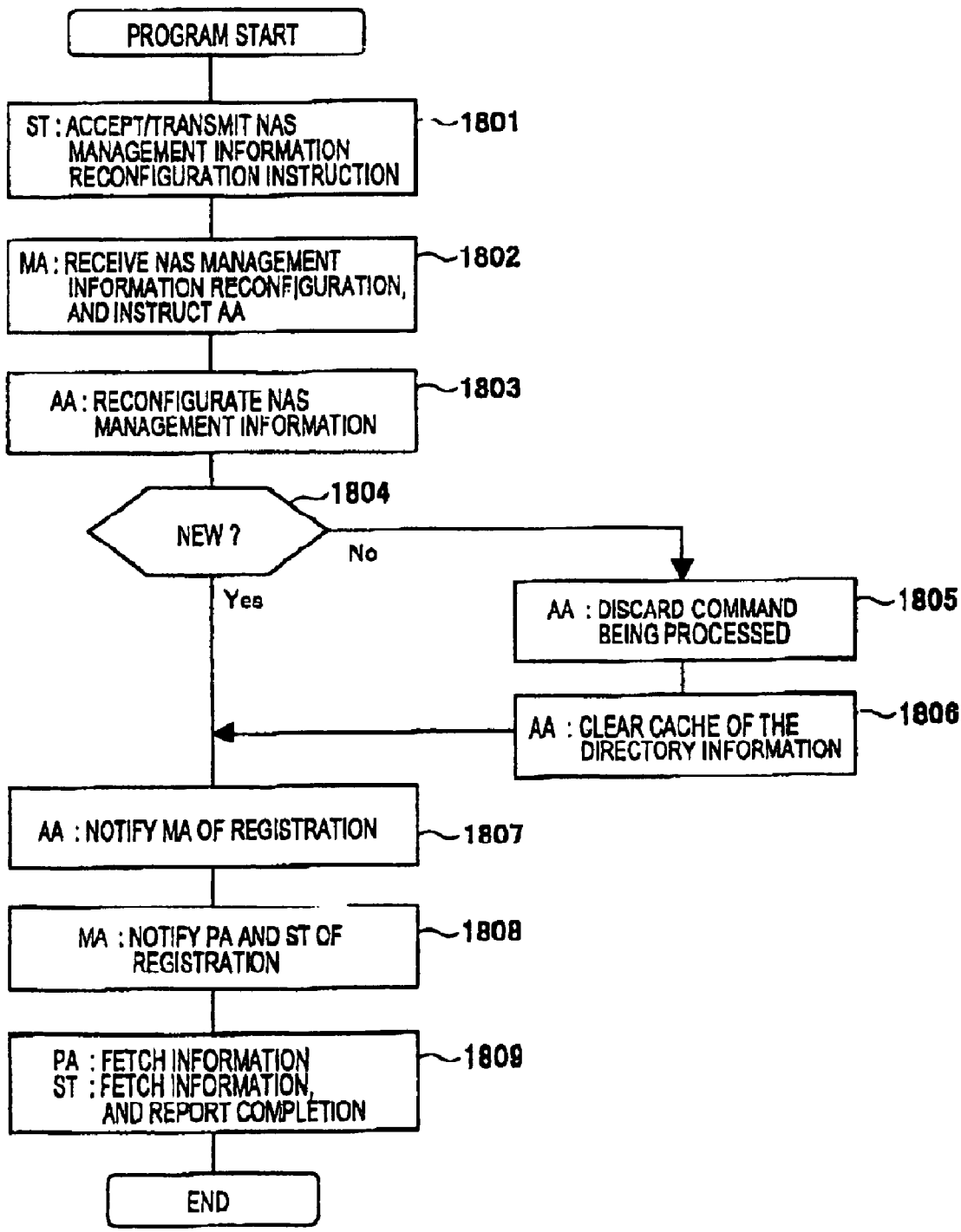
FIG. 18 is a diagram showing one example of a NAS management information reconfiguration program.

FIG. 18 is a diagram showing one example of the processing flow of the NAS management information reconfiguration program 225. Here, this processing is executed in case the NAS management information is to be newly registered and in case a portion or all the NAS management information on an AA is to be copied to another AA so that the processing is inherited. Moreover, the processing is executed at the following time. Specifically, the AA and the PA have mechanisms for measuring their own processing loads, and the management server collects the information of the processing load through the MA or the ST, so that either the storage manager or the not-described processing load management processor over the management server controls to distribute the load from the AA of a high processing load or the PA for the processing of the AA to the AA of a low processing load or the PA based on the information.

Moreover, the processing is executed under the control of the storage manager or the management server, in case the AA is replaced by a new one for a partial repair or for a higher performance.

The ST having accepted the NAS management information reconfiguration instruction from the storage manager or the management server 110 transfers (at Step 1801) the same instruction to the MA. To this instruction, there is added the NAS management information entry on the AA to reconfigurate the information. The MA having received the instruction reconfigures the NAS management information and transmits (at Step 1802) the instruction for reconfigurating the NAS management information, to the AA relating to the entry of the NAS management information to be configured. The AA having received the instruction reconfigurating (at Step 1003) the copy 227 of the NAS management information. In case the reconfiguration instruction is to add a new entry (at Step 1804), the MA is notified (at Step 1807) of the completion of the registration.

In case the reconfiguration instruction is to reconfigurate the existing entry, the AA discards (at Step 1805) the command being processed on the reconfiguration, clears (at Step 1806) the directory information on the reconfiguration cached in the memory 149 and notifies (at Step 1807) the MA of the completion of the registration. The MA having received the registration completion notice from the AA notifies (at Step 1808) each PA and ST of the updating of the NAS management information.

The PA notified of the NAS management information updating fetches the copy 221 of the updated NAS management information into the memory 143. On the other hand, the ST having been notified of the NAS management information updating fetches (at Step 1809) the updated information and then outputs the completion report to the requester such as the storage manager or the management server 110.

Here, when the NAS management information is reconfigurated by the NAS/port failure management program, the processing is started from Step 1802 of the aforementioned processing procedure.

Figure 19:
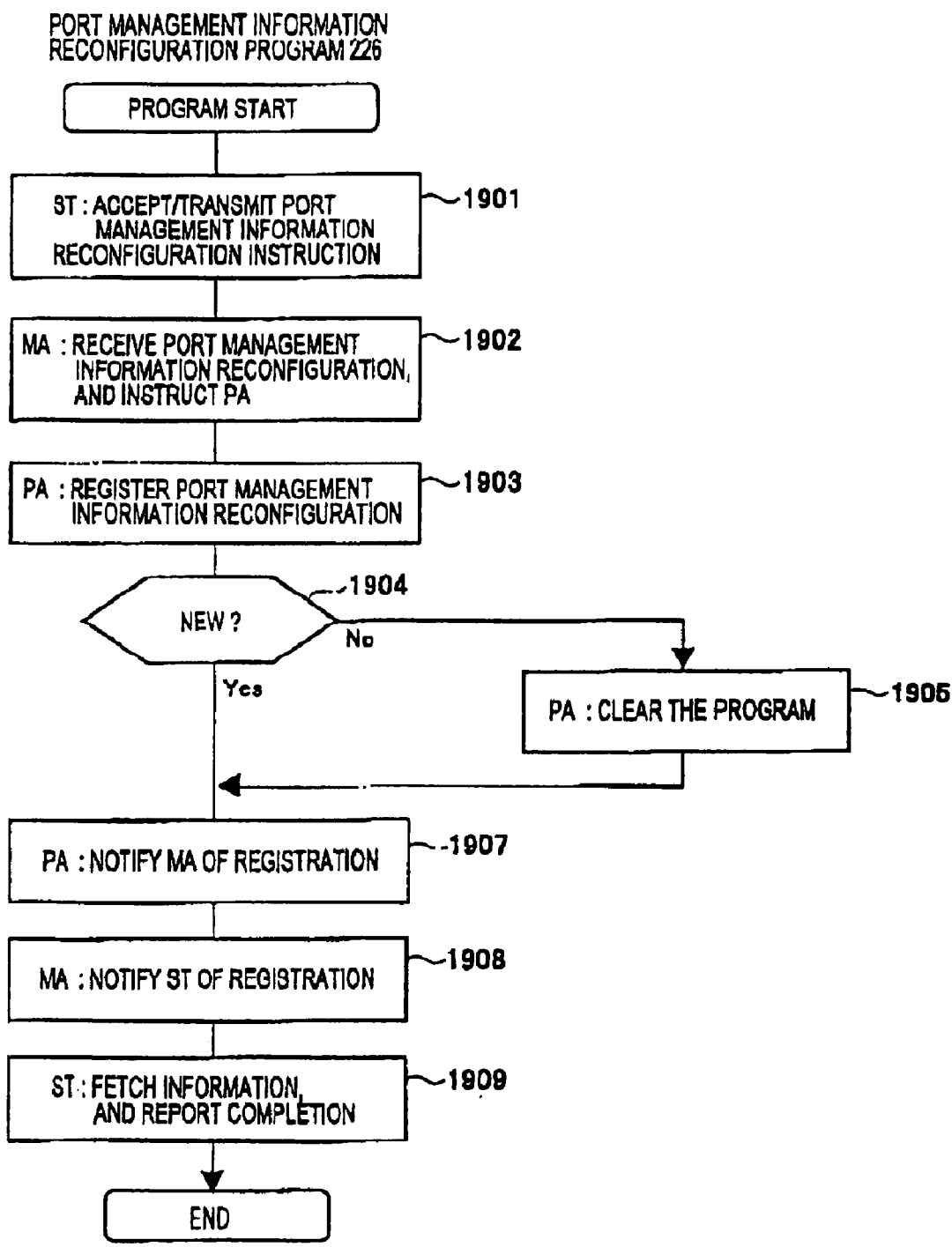
FIG. 19 is a diagram showing one example of a port management information reconfiguration program.

FIG. 19 is a diagram showing one example of the processing flow of the port management information reconfiguration program 226. Here, this processing is executed in case the port management information is to be newly registered and in case the port management information on a port 141 is to be partially or wholly to another port 141 so that its processing may be inherited. Moreover, this processing is also executed in the following case. The PA has a mechanism for measuring its own processing load, and the management server collects the information on that processing load through the MA or the ST, so that the storage manager or the not-described processing load management processor over the management server controls to distribute the load from a port of a higher processing load to a port of a lower processing load based on the information. Moreover, the processing is executed under the control from the storage manager or the management server, in case the PA is replaced by a new one for a partial repair or for a higher performance.

The ST having accepted the NAS management information reconfiguration instruction from the storage manager or the management server 110 transfers the same instruction to the MA. To this instruction, there is added (at Step 1901) the entry of the port management information on the port to reconfigurate the information. The MA having received the instruction reconfigurates the port management information, and transmits (at Step 1902) an instruction to reconfigurate the copy 222 of the port management information, to the PA having the port 141 relating to the entry of the port management information to be reconfigurated.

The PA having received the instruction reconfigurates (at Step 1903) the copy 222 of the port management information. In case the reconfiguration instruction is to add a new entry or to add information to the existing entry (at Step 1904), the PA notifies (at Step 1907) the MA of the completion of the registration, and starts the communication program at the port 141 in itself in accordance with the contents of the copy 222 of the port management information renewed. In case the reconfiguration instruction was to reconfigurate the contents of the existing entry, the PA clears (at Step 1905) the program on the reconfiguration, starts the communication program in its own port 141 in accordance with the contents of the copy 222 of the updated port management information, and then notifies (at Step 1907) the MA of the completion of the registration. The MA having received the registration completion notice from the PA notifies (at Step 1908) the ST that the port management information has been updated.

The ST notified of the port management information updating fetches (at Step 1909) the updated information and then outputs the completion report to report it to the requester such as the storage manager or the management server 110.

Here, when the port management information is to be reconfigurated by the NAS/port failure management program, the processing is started from Step 1902 of the aforementioned processing procedure.

Here will be described the storage control processing to be executed at the individual portions of this system. The processing to assign the device including the physical device existing in the storage 130 and the external device existing in the external storage 180 to a specific host computer 100 or AA so that the device can be used from the host computer 100 or AA can be coarsely divided into the external device definition program 253, the logical device definition program 255 and the LU path definition program 252. The system manager is enabled to set the storage 130 by performing the aforementioned three programs sequentially so that the upper logical device may be assigned to the host computer 100 or the AA.

Figure 8:
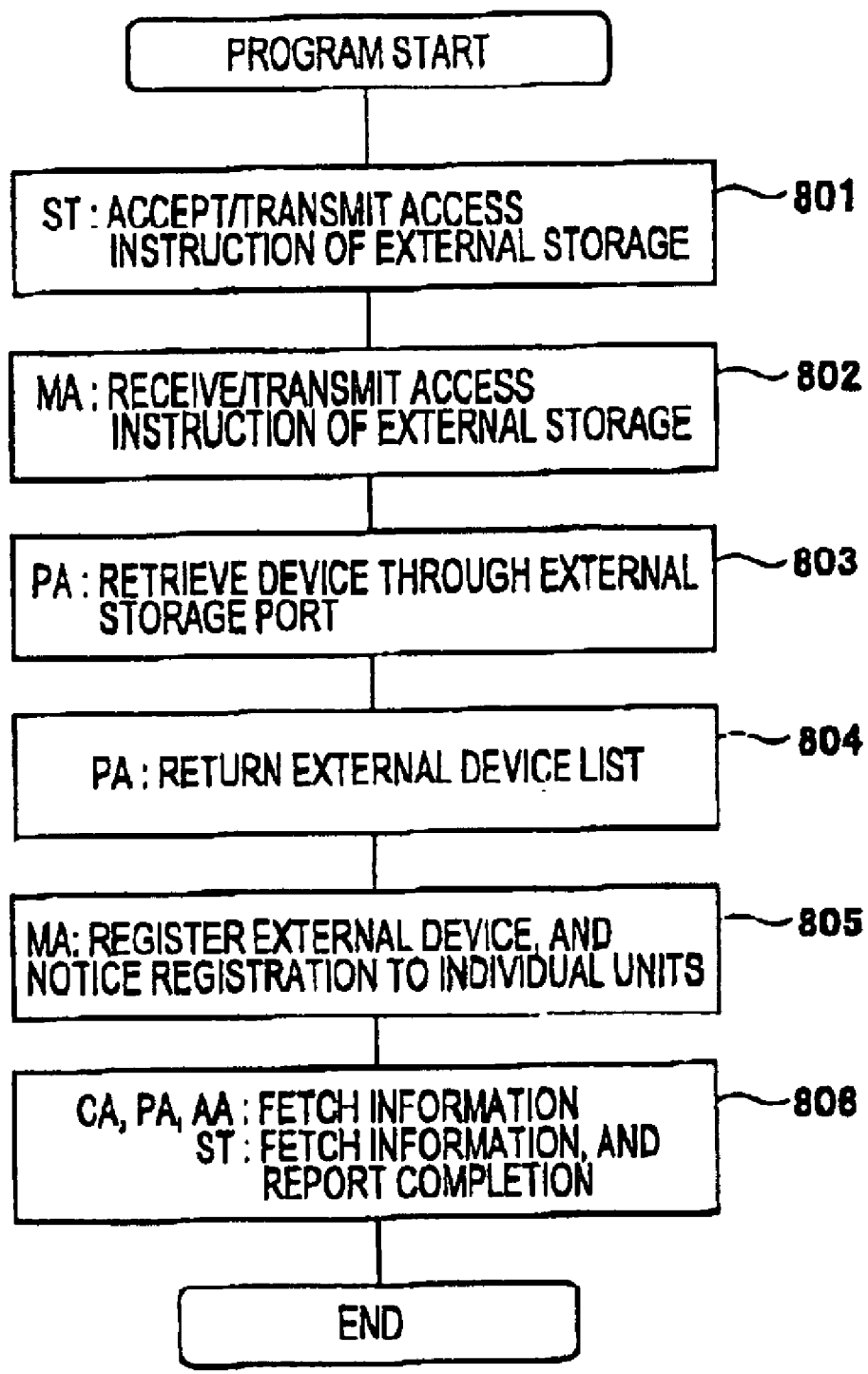
FIG. 8 is a diagram showing one example of an external device definition program.

FIG. 8 is a diagram showing one example of the processing flow of the external device definition program 253. This external device definition program 253 is a program for introducing a device in the external storage 180 as the external device under the management of the storage 130.

At first, the ST having accepted the access instruction of the external storage 180 from the storage manager or the management server 110 transmits the access instruction to the MA. To this access instruction, thereade added (at Step 801): the information for defining the external storage 180 to be accessed or the access objective such as the WWN or the IP address of the port 181 of the external storage 180 and/or the device identifier obtained from the response when an Inquiry command is transmitted to the external storage, and the number of the port 141 of the storage 130 to be connected to the external storage 180.

The MA having received the access instruction of the external storage 180 transmits (at Step 802) the external storage access instruction having the information for identifying the external storage 180 and the number of the port 141 to be connected to the external storage 180, to all the PAs corresponding to the numbers of all ports 141 added to the access instruction.

The PA having received the external storage access instruction from the MA searches the external device to be connected to using the identifier (hereinafter referred to as "external storage identifier") of the external storage 180 added to the access instruction. In case the WWW or IP address of the port 181 is received as the external storage identifier, more specifically, the Inquiry command is transmitted by the PA from the port 141 designated with the port number added to the access instruction, to all the LUNs corresponding to the port 181 of the external storage 180, and the LUN having returned the normal response for the Inquiry command is adopted as the external device registration candidate.

In case the PA receives only device indentifier as the external storage indentifier, the PA transmits the Inquiry command to all the LUNs corresponding to respective node ports (detected at the time or log-in of the node port) of the external storage 180 detected by each of all the ports 141 of the PA. Then, for the device (LUN) having returned the normal response for the Inquiry command, the PA compares the device indentifier in the response with the external storage indentifier and adopts the matching device as a candidate for the external device registration (at Step 803).

The PA returns the information list on the detected external device registration candidate to the MA. This information list contains (at Step 804) the information necessary for setting the external device management information 205 on each external device registration candidate.

The MA having accepted the information list numbers the external device contained in the external device list accepted, registers the device information in the external device management information 205, and notifies the remaining individual portions of the updating of the same information. Here, the information to be registered in the external device management information 205 by the MA at this processing step specifically contains the external device number assigned to the external device by the MA, the size acquired from the response to the inquiry command, the storage identifier, the device number in the external storage, the PA/initiator port number list to be informed from the PA to the MA, and the target port ID/target ID/LUN list.

On the other hand, the corresponding upper logical device number and the corresponding CA number/lower logical device number/AA number are not assigned yet so that the MA sets the invalid value or the initial value in the corresponding entry. Moreover, the entry 75 is set (at Step 805) with the "Off Line" state.

The individual CA, PA and AA having received the update notice of the external device management information 205 read the external device management information 205 stored in the control memory 164 of the MA, in the individual memories. On the other hand, the ST fetches (at Step 806) the external device management information 205 in the memory, and outputs the completion notices so as to notice the completion of the external device definition program to the requester of the program such as the storage manager or the management server 110.

Here, the storage manager or the management server 110 instructs the storage 130 to be accessed but not the external storage 180 to be introduced, and instructs the storage 130 only the access instruction of the external storage 180, so that all the devices individually belonging to all the external storages 180 detected by the storage 130 from all the ports 141 may be registered as the external devices. Moreover, no explicit access instruction is not given from the storage manager or the management server 110 so that all the devices detected by the storage 130 may be registered as the external device at the instant when the external storage 180 is connected to the storage 130.

Figure 9:
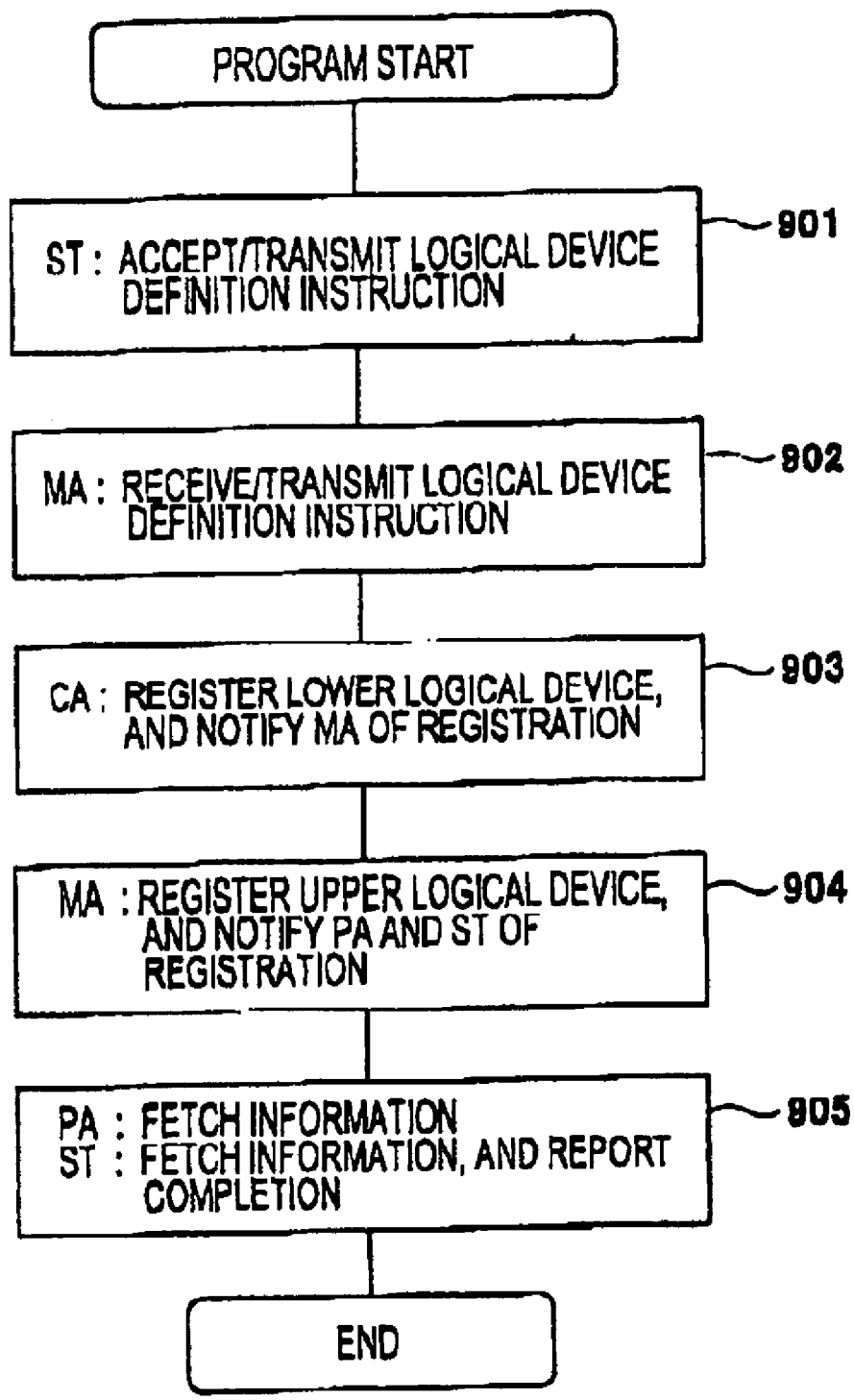
FIG. 9 is a diagram showing one example of a logical device definition program.

FIG. 9 is a diagram showing one example of the processing flow of the logical device definition program 255. In response to the instruction from the storage manager or the management server 110, the logical device definition program 255 defines the upper or lower logical device for the physical device to be defined by the storage 130 or the external devise defined by the external device definition program 253.

The ST having accepted the logical device definition instruction from the storage manager or the management server 110 transmits the instruction to the MA. To the logical device definition instruction, thereade added: the number of the physical device or external device, to which the logical device is assigned; the number of the upper logical device to be assigned; the number of the lower logical device to be assigned; and the number of the CA for managing the lower logical device. Here in this embodiment, for simplicity of the description, one logical device is assigned to one physical or external device. However: one logical device may be defined for the device group composed of two or more physical or external devices; two or more logical devices may be defined for one physical or external device; and two or more logical devices may be defined for the device group composed of two or more physical or external devices.

In the individual cases, however, it is necessary in the lower logical device management information 201 (at Step 901): to add the information such as the starting position and size of the logical device in the physical or external device; to make the corresponding physical and external device number entry of a plurality of devices; and to make the corresponding to the lower logical device number entry of a plurality of devices for the pieces 202 and 205 of the physical and external device management information.

The MA having received (at Step 902) the logical device definition instruction defines the objective CA from the information added to the logical device definition instruction, and transmits the logical device definition instruction to the defined CA.

The CA having received the logical device definition instruction registers (at Step 903) the lower logical device for the physical or external device instructed. For the objective device entries of the lower logical device management information 201 (i.e., the entries corresponding to the numbers of the lower logical devices added to the logical device definition instruction), more specifically, the CA registers: the lower logical device number added to the logical device definition instruction, in the entry 51; the number of the physical or external device added to the logical device definition instruction, in the entry 53; the size of the lower logical device in the entry 52; and the upper logical device number added to the logical device definition instruction, in the entry 55, and sets the "On Line" in the entry 54.

Moreover, the corresponding CA number/lower logical device number or the physical/external device are set, and the device status is updated to the "On Line". After the registration was completed, the CA notifies the MA of it (at Step 903).

Next, the MA assigns the upper logical device to the lower logical device designated by the logical device definition instruction, and notifies the individual portions that the control information has been updated. For the device entries of the upper logical device management information 203 (i.e., the entries corresponding to the numbers of the upper logical devices added to the logical device definition instruction), more specifically, the MA sets: the upper logical device number added to the logical device definition instruction, in the entry 31; the size of the upper logical device in the entry 32; the CA number and the number of the lower logical device added to the logical device definition instruction, in the entry 33; the "Off Line" status as the device status in the entry 34; and the invalid value in the entries 35 and 36 because these entries are not assigned yet.

In case the assignment objective of the upper logical device is the external device, moreover, the external device number added to the logical device definition instruction is set in the entry 38, and the device access mode is set to the "Direct PA" as the initial value. In case the assignment objective of the upper logical device is the external device, moreover, the corresponding entry 73 of the external device management information 205 is set with the upper logical device number. And, the MA notifies (at Step 904) each PA and ST of the updating of the control information.

The PA notified of the control information updating fetches the updated information to the memory 143. On the other hand, the ST notified of the control information updating fetches (at Step 905) the updated information, and then outputs the end report so as to report the completion of the logical device definition program to the requester such as the storage manager or the management server 110.

Figure 10:
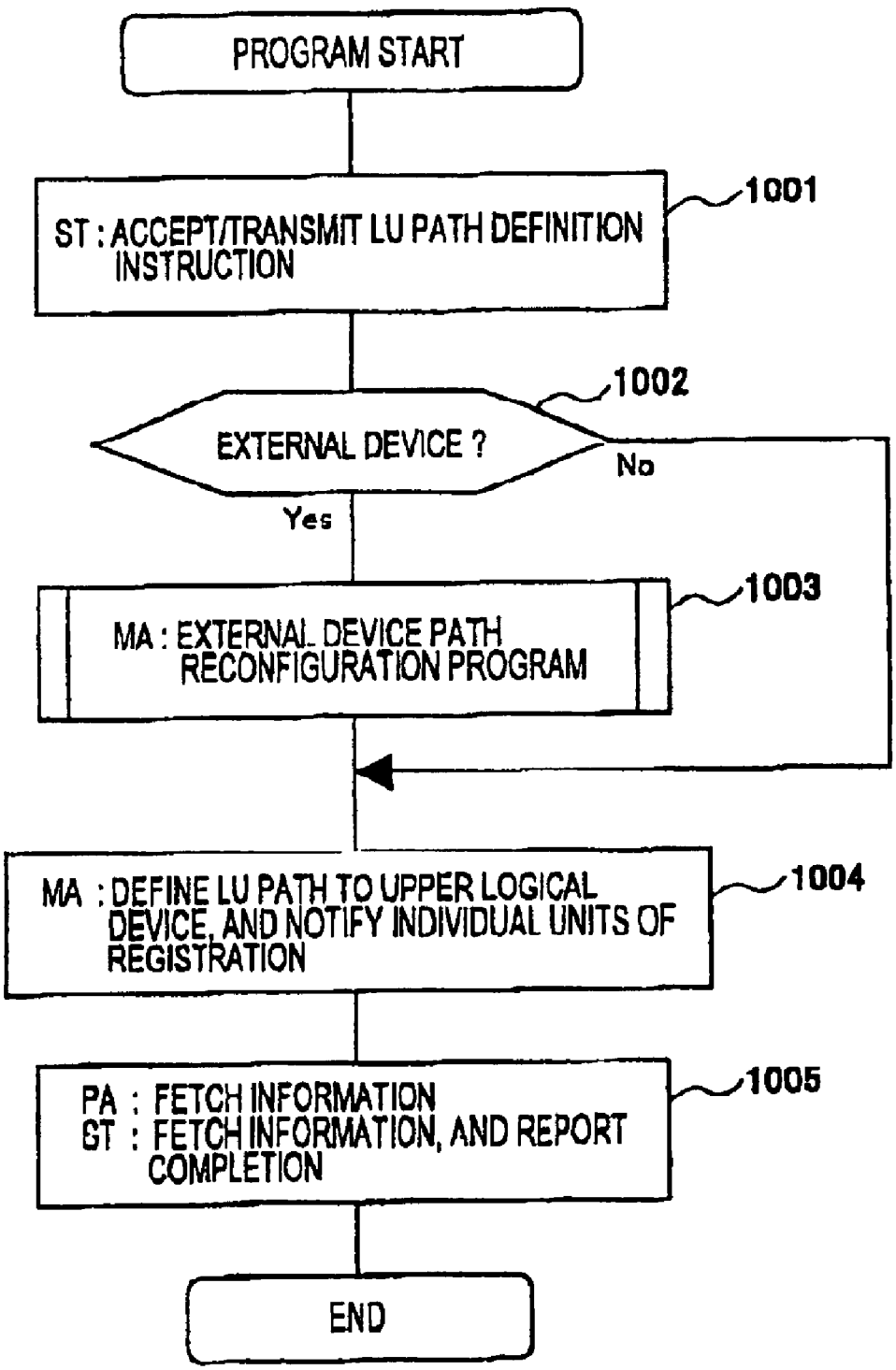
FIG. 10 is a diagram showing one example of an LU path definition program.

FIG. 10 is a diagram showing one example of the processing flow of the LU path definition program 252. The ST having accepted the LU path definition instruction from the storage manager or the management server 110 transfers the same instruction to the MA. To this instruction, there are added not only the objective upper logical device number, the number of the port 141 defining the LU, and the LUN but also the identifier (such as the WWN of the port 107 belonging to the host computer) of the host computer 100 for accessing the same LU or the identifier (e.g., the AA number) of the AA and the information indicating the request function level for the upper logical device.

Here, the request function level indicates the level of the reliability or the like of the data requested by the upper logical device. Specifically, it is designated whether or not there is applied the data cooperation function such as the data copy or the device reconfiguration provided by the storage 130 or the access quickening function by making the cache resident to store the data over the cache. As a result, the level of the reliability of the data varies in dependence on the presence/absence of the application of the function. Here may be designated the information which indicates whether or not the data to be stored in the upper logical device has to be processed as the request function level through the CA (oven if the data is not stored in the disk device 157 connected to the CA) (at Step 1001).

The MA having received LU path definition instruction judges (at Step 1002) from the entry 38 in the upper logical device management information 203 on the upper logical device designated by the LU path definition instruction, whether or not the device corresponding to the upper logical device is the external device, and executes (at Step 1003) the external device path reconfiguration program in the cas of the external device.

After completion of the external device path reconfiguration program or in case the upper logical device designated by the LU path definition instruction is not made to correspond to the external device, the MA executes the LU path registration for the upper logical device. Specifically, the MA sets the corresponding information designated by th LU path definition instruction, in the entry 35 and the entry 36 of the device entry of the upper logical device management information 203, and sets the configuration information including the target ID/LUN in accordance with the LU path definition instruction in the vacant entry on the port 141 designated by the LU path definition instruction of the LU path management information 206. After these registration and setting, the MA notifies them to the remaining individual portions (at Step 1004).

The PA having received the notice fetches the information newly set and registered, and the ST having received the notice fetches the information newly set and registered (at Step 1005) and outputs the completion report so as to notify the completion report to the requester such as the management server 110 or the storage manager.

Figure 14:
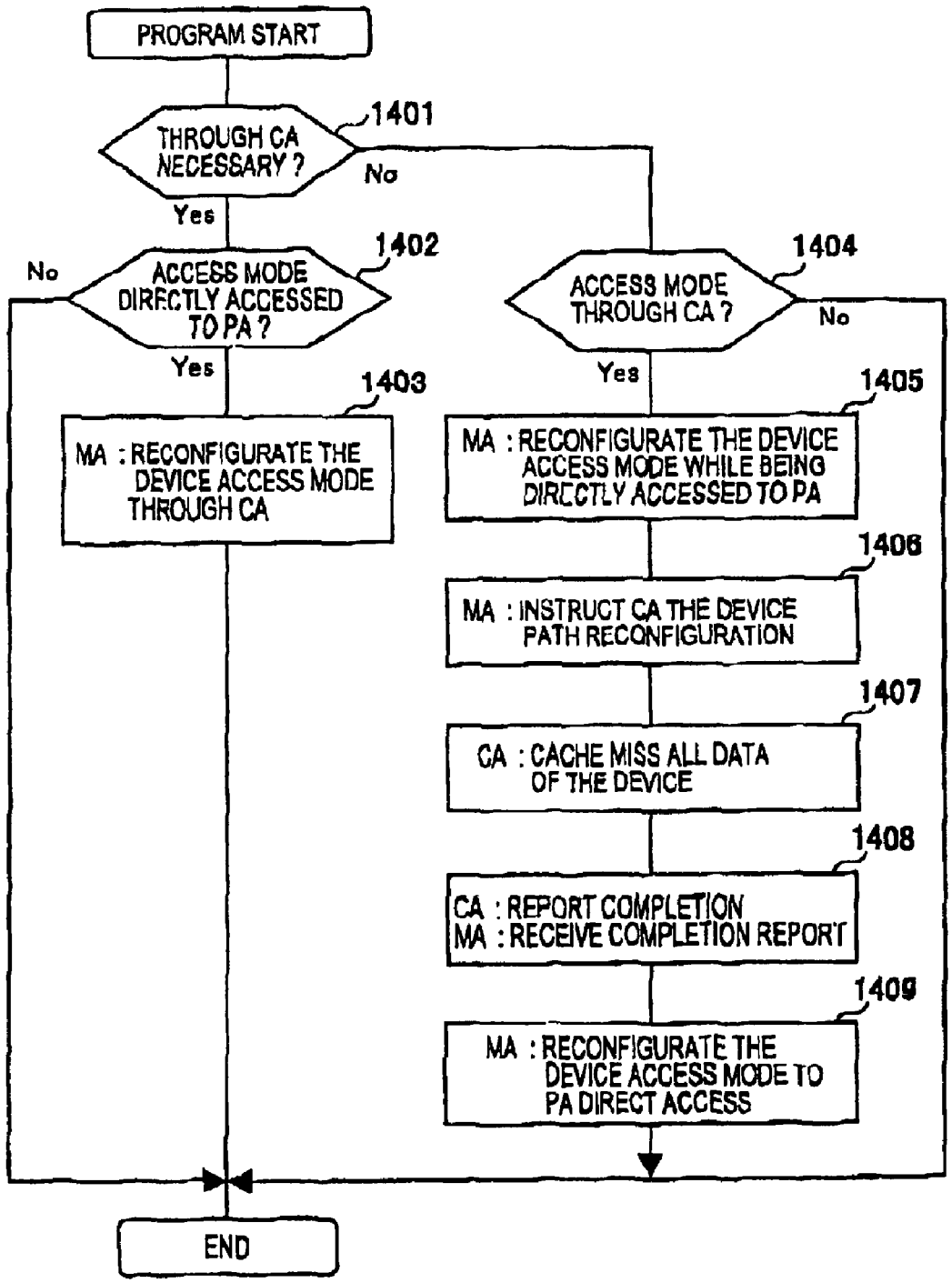
FIG. 14 is a diagram showing one example of an external device path reconfiguration program.

FIG. 14 is a diagram showing one example of the processing flow of the external device path reconfiguration program 256. When the LU path is defined for the upper logical device corresponding to the external device, the external device path reconfiguration program 256 is executed to reconfigurate the path from the direct PA path of the initial state, in case it is judged that the input/output operation through the CA is necessary on the basis of the function level requested by the storage manager for the external device or in case the MA receives the changing instruction of the function request level for the upper logical device through the ST from the storage manager or the management server 110.

The MA having received the reconfiguration instruction of the function request level judges (at Step 1401) it on the basis of the reconfiguration instruction whether or not the path of the upper logical device defined with the information in the reconfiguration instruction should be through the CA. In case the path should be through the CA, the MA judges (at Step 1402) with reference to the upper logical device management information 203 whether or not the access mode of the upper logical device is the direct PA mode.

In case the upper logical device is the direct PA mode, the MA reconfigurates (at Step 1403) the path of the upper logical device from the "Direct PA" to the "through CA". In case the mode has already been through the CA, the program is ended because the reconfiguration is not needed.

In case it is decided at Step 1401 that the path of the upper logical device should be direct PA, the MA judges (at Step 1404) with reference to the upper logical device management information 203 whether or not the device access mode of the upper logical device is through CA.

In case the device access mode of the upper logical device is through CA, the MA has to reconfigurate the path from the "through CA" to the "Direct PA". At first, therefore, the MA reconfigurates (at Step 1405) the entry 37 in the upper logical device management information 203 of the upper logical device into the "to Direct PA", and defines, with reference to the upper logical device management information 203, the CA managing the lower logical device made to correspond to the upper logical device. And, the defined CA is notified (at Step 1406) that the path of the upper logical device is reconfigured from through CA to direct PA.

The notified CA retrieves the disk cache 154 for all the data on corresponding lower logical devices thereby to miss the disk cache, that is, writes out the data, as not updated to the physical device of the external device, from the disk cache 154 to the corresponding device thereby to update the data in the device, and then immediately releases the cache area assigned to the data, for the updated data. The CA retrieves the disk cache 154 sequentially from the leading one of the lower logical devices by using the cache management information. Moreover, the CA manages the program for the portion having been retrieved and missed, by managing the reconfiguration management pointer of the upper logical device and the lower logical device management information (at Step 1407).

When the missing operations is completed for all the areas of the disk cache 154, the CA reports (at Step 1408) it to the MA, and the MA reconfigurates the entry 37 in the upper logical device management information 203 into the "Direct PA" thereby to complete the path reconfiguration program.

According to the embodiment thus far described, a NAS system capable of decentralizing the processing load can be realized by separating the I/F portion (PA), to which the address for the host computer 100 to send the command is attached, the NAS server portion (AA) for the file access program, the cache adapter (CA) for operating the device, and the IF portion (PA) to be connected to the external storage 180, and by accessing through the internal network 170.

According to the embodiment, the "Cooperative" mode is established by the I/F portion (PA), to which the address for the host computer 100 to send the command is attached, the NAS server portion (AA) for the file access program, the cache adapter (CA) for operating the device, and the IF portion (PA) to be connected to the external storage 180. In case mass data is to be transferred by the host computer 100 and the AA, it can be directly transferred between the I/F portion (PA) for the host computer and the I/F portion (PA) to be connected to the cache adapter (CA) or the external storage 180. Thus, it is possible to realize the NAS system which can lighten the processing load of the AA and has a quick command response to the host computer.

According to the embodiment, the corresponding relation between the file to be managed with the NAS management information 223 by the AA and the IP address of the I/F portion, to which the host computer 100 transmits the command for accessing the file, can be so set in the entry 1602 that one PA may be processed by a plurality of AAs, and the processing load is lightened by the execution of the processing with the AAs although one NAS system looks as if it is accessed from the host computer 100. Thus, it is possible to realize the NAS system which has a quick command response to the host computer 100.

According to the embodiment, the corresponding relation between the file to be managed with the NAS management information 223 by the AA and the IP address of the I/F portion, to which the host computer 100 transmits the command for accessing the file, can be so set in the entry 1602 that one AA may have a plurality of IP addresses, and the processing load is lightened by the execution of the processing with a plurality of PAs or ports 141 although it looks from the host computer 100 as if there are a plurality of NAS systems. Thus, it is possible to realize the NAS system which has a quick command response to the host computer 100.

According to the embodiment, the corresponding relation between the file to be managed with the NAS management information 223 by the AA and the IP address of the I/F portion, to which the host computer 100 transmits the command for accessing the file, can be so set in the entry 1602 that one AA may have a plurality of IP addresses, and it looks from the host computer 100 as if there are a plurality of NAS systems. Thus, it is possible to realize the NAS system which can use the NAS systems for separate applications.

According to the embodiment, the corresponding relation between the file to be managed with the NAS management information 223 by the AA and the IP address or the I/F portion, to which the host computer 100 transmits the command for accessing the file can be partially transferred to another AA, whereby the AA having a higher processing load is expanded to lighten processing load without affecting the host computer 100. Thus, it is possible to realize the NAS system which can improve the command response to the host computer.

According to the embodiment, the corresponding relation between the file to be managed with the NAS management information 223 by the AA and the IP address of the I/F portion, to which the host computer 100 transmits the command for accessing the file can be partially modified, whereby the PA having a higher processing load is expanded, or the load is distributed to the PA having a low processing load, thereby to lighten the processing load. Thus, it is possible to realize the NAS system which can improve the command response to the host computer.

According to the embodiment, by copying all entries on the AA of the NAS management information 223 to the entries of the new AA, the AA can be replaced by a new package having a high processing ability without affecting the host computer 100, thereby to lighten the processing load. Thus, it is possible to realize the NAS system which can improve the command response to the host computer.

According to the embodiment, by moving a portion of the IP address given to the port of the port management information 224, to the entry of another port 141, the access to the port 141 is distributed without changing the setting of the host computer 100, thereby to lighten the processing load. Thus, it is possible to realize the NAS system which can improve the command response to the host computer.

According to the embodiment, in case the AA fails, the management information of the AA can be inherited to an alternate AA preset in the NAS management information 223. Thus, it is possible to realize the NAS system which can continue the processing without reconfigurating the setting of the host computer 100.

According to the embodiment, in case the port 141 of the PA fails, either the information on the port 141 of the port management information 224 is wholly copied to the entry of the unused port 141, or the information on the port is partially moved to the used port 141. Thus, it is possible to realize the NAS system which can be used without reconfigurating the setting of the host computer 100.

According to the embodiment, the CA can provide the AA with the external storage as its own device so that an, inexpensive external storage can be utilized without mounting the disk device 157 on the storage 130. Thus, it is possible to realize the NAS system having the aforementioned effects of the embodiment at a low cost.

According to the embodiment, the AA can use the external storage directly not through the CA thereby to realize the NAS system having the aforementioned effects of the embodiment at a low cost.

According to the aforementioned embodiment, even in case the using load of the NAS rises, the processing of a portion of a high processing load can be so controlled and distributed that the response may not drop.

According to the aforementioned embodiment, even in case a failure occurs, the information of the failure portion can be inherited to another portion so that the NAS can be continuously accessed from the computer and used without reconfigurating the setting of the computer.

What we claim:

1. A storage system comprising:
   an interface unit connected to a host computer;
   a first controller which processes a file operation;
   a second controller which processes the read/write of data for a storage; and
   an internal network which accesses said interface unit, said first controller and said second controller mutually,
   wherein said interface unit selects from one of said first controller and said second controller, a transfer destination of a frame transmitted from said host computer and transfers said frame through said internal network to the selected controller
   said storage system further comprising a control memory having first management information which reduces the processing load of said first controller and said internal network by indicating cooperation between said first controller and said interface unit and said second controller such that data from said host computer can be transmitted directly to said storage via said interface unit and said second controller.

2. A storage system according to claim 1,
   wherein said first controller executes the read/write of the data for said storage through said second controller, in case it receives said frame from said interface unit and executes the file operation designated by said frame.

3. A storage system according to claim 2, further comprising a second interface unit connected to another storage,
   wherein said interface unit selects the transfer destination of said frame from said first controller, said second controller or said second interface unit.

4. A storage system according to claim 3,
   wherein said first controller executes the read/write of the data for said another storage through said second interface unit, in case it receives said frame from said interface unit and executes the file operation designated by said frame.

5. A storage system according to claim 1, further comprising a plurality of said first controllers,
   wherein said interface unit selects a predetermined first controller from said plurality of first controllers and transmits said frame through said internal network to said selected first controller, in case said frame is a frame containing a command requesting a file operation.

6. A storage system according to claim 5, wherein
   said interface unit holds information on the corresponding relation between said plurality of first controllers and an identifier contained in the frame received from said host computer, and decides the first controller, to which said frame is to be transferred, on the basis of said information when said frame is received.

7. A storage system according to claim 1, wherein,
   according to the instruction of said first controller having received said frame, said interface unit and said second controller transmit/receive the data on the processing of said first controller through said internal network.

8. A storage system according to claim 4, wherein,
   according to the instruction of said first controller having received said frame, said interface unit and said second interface unit transmit/receive the data on the processing of said first controller through said internal network.

9. A storage system according to claim 6, wherein
   said information contains the information indicating that said plurality of first controllers correspond to one port belonging to said interface unit for receiving said frame.

10. A storage system according to claim 1, further comprising a plurality of said interface units, wherein
    the frame received by said plurality of interface units is transferred to said first controller.

11. A storage system according to claim 9, further comprising a management unit, wherein
    said interface unit reconfigures the contents of said information and changes the transfer destination of said frame in accordance with the instruction of said management unit.

12. A storage system according to claim 11, further comprising:
    a plurality of said interface units,
    wherein said plurality of said interface units includes an alternate interface unit which
    inherits the processing executed in said interface unit in accordance with the instruction of said management unit.

13. A storage system according to claim 12, wherein
    the instruction of said management unit is made when the failure of said interface unit is detected by each device belonging to said storage, and
    said management unit has the information of said another interface unit inheriting the processing at the time of a failure of said interface unit.

14. A storage system according to claim 12, further comprising:
    a plurality of said first controllers,
    wherein said plurality of first controllers includes an alternate first controller which inherits the processing executed in said first controller in accordance with the instruction of said management unit.

15. A storage system according to claim 14, wherein
    the instruction of said management unit is made when the failure of said first controller is detected by each device belonging to said storage, and
    said management unit has the information of said another first controller inheriting the processing at the time of a failure of said first controller.

16. A storage system according to claim 4, wherein
    said second controller controls said another storage through said second interface unit.

17. A storage system according to claim 1, wherein
    said second controller has a cache memory and a disk device.

18. A storage system comprising:

an interface unit connected to a host computer;

a controller which processes a file operation;

a second interface unit which processes the read/write of data for a storage; and an internal network which accesses said interface unit, said second interface unit and said controller mutually, wherein said interface unit selects from one of said controller and said second interface unit, a transfer destination of a frame transmitted from said host computers and transfers said frame through said internal network to the selected controller or said second interface unit said storage system further comprising a control memory having first management information which reduces the processing load of said controller and said internal network by indicating cooperation between said first interface unit, said second interface unit and said controller such that data from said host computer can be transmitted directly to said storage via said interface unit and said second interface unit without passing through the controller.

19. A storage system according to claim 1, wherein said first management information includes information indicating an alternate first controller in the event of a failure in said first controller, said alternate first controller receiving relevant information of said first controller so as to be able to take over processing for said first controller.

20. A storage system according to claim 19, said relevant information of said first controller including a list of IP addresses for designating a transmission destination by said host computer, wherein if the list of IP addresses includes more than one IP address, then said first controller appears as a plurality of first controllers to said host computer.

21. A storage system according to claim 1, wherein said control memory has second management information for managing said interface unit such that if one port of said interface unit fails, an alternate port specified in said second management unit inherits processing for said failed port.

22. A storage system according to claim 20, wherein said control memory has second management information for managing said interface unit such that if one port of said interface unit fails, an alternate port specified in said second management unit inherits processing for said failed port.

* * * * *